US011455543B2

(12) United States Patent
D'Souza et al.

(10) Patent No.: US 11,455,543 B2
(45) Date of Patent: Sep. 27, 2022

(54) TEXTUAL ENTAILMENT

(71) Applicant: ACCENTURE GLOBAL SOLUTIONS LIMITED, Dublin (IE)

(72) Inventors: Shaun Cyprian D'Souza, Mumbai (IN); Ashutosh Pandey, Allahabad (IN); Binit Kumar Bhagat, Pune (IN); Vijay Apparao Patil, Dharbandora (IN); Chaitanya Teegala, Saidapur (IN); Sangeetha Basavaraj, Bangalore (IN); Eldhose Joy, Thane (IN); Nikita Ramesh Rao, Bangalore (IN); Harsha Jawagal, Bangalore (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 472 days.

(21) Appl. No.: 16/653,523

(22) Filed: Oct. 15, 2019

(65) Prior Publication Data
US 2021/0110277 A1 Apr. 15, 2021

(51) Int. Cl.
*G06N 5/00* (2006.01)
*G06N 5/02* (2006.01)
(Continued)

(52) U.S. Cl.
CPC ............. *G06N 5/006* (2013.01); *G06F 40/30* (2020.01); *G06F 40/49* (2020.01); *G06N 3/0445* (2013.01);
(Continued)

(58) Field of Classification Search
CPC ....... G06F 40/30; G06F 40/49; G06N 3/0445; G06N 3/0454; G06N 3/08; G06N 5/006; G06N 5/025
See application file for complete search history.

(56) References Cited

U.S. PATENT DOCUMENTS 10,747,651 B1 * 8/2020 Vanderwall .......... G06F 11/3684
10,860,630 B2 * 12/2020 Blouw .................... G06F 40/30
(Continued)

FOREIGN PATENT DOCUMENTS

CA 3006826 A1 * 11/2019 ............. G06F 40/30
CN 107967472 A * 4/2018

OTHER PUBLICATIONS

Adrian Groza and Roxana Szabo, "Enacting textual entailment and ontologies for automated essay grading in chemical domain", Nov. 9, 2015, Intelligent System Group, Department of Computer Science, Technical University of Cluj-Napoca, Romania, arXiv:1511. 02669v1 [cs.AI], pp. 6 (Year: 2015).*
(Continued)

*Primary Examiner* — Chau T Nguyen
(74) *Attorney, Agent, or Firm* — Mannava & Kang, P.C.

(57) ABSTRACT

Examples of a textual entailment generation system are provided. The system obtains a query from a user and implements an artificial intelligence component to identify a premise, a word index, and a premise index associated with the query. The system may implement a first cognitive learning operation to determine a plurality of hypothesis and a hypothesis index corresponding to the premise. The system may generate a confidence index for each of the plurality of hypothesis based on a comparison of the hypothesis index with the premise index. The system may determine an entailment value, a contradiction value, and a neutral entailment value based on the confidence index for each of the plurality of hypothesis. The system may generate an entailment result relevant for resolving the query comprising the plurality of hypothesis along with the corresponding entailed output index.

17 Claims, 14 Drawing Sheets

(51) Int. Cl.
*G06F 40/30* (2020.01)
*G06F 40/49* (2020.01)
*G06N 3/04* (2006.01)
*G06N 3/08* (2006.01)

(52) U.S. Cl.
CPC .............. *G06N 3/0454* (2013.01); *G06N 3/08* (2013.01); *G06N 5/025* (2013.01)

(56) References Cited

U.S. PATENT DOCUMENTS

| | | | | |
|---|---|---|---|---|
| 10,915,562 | B2* | 2/2021 | Erpenbach | G06F 16/3334 |
| 2015/0199339 | A1* | 7/2015 | Mirkin | G06F 40/45 704/2 |
| 2017/0193086 | A1* | 7/2017 | Zeng | G06F 40/30 |
| 2018/0018573 | A1* | 1/2018 | Henderson | G06N 20/00 |
| 2018/0107940 | A1* | 4/2018 | Lieberman | G06N 5/022 |
| 2019/0370389 | A1* | 12/2019 | Blouw | G06F 40/30 |
| 2020/0184959 | A1* | 6/2020 | Yasa | G06F 40/30 |

OTHER PUBLICATIONS

Vu et al., "Grounded Textual Entailment", Jun. 14, 2018, Creative Commons Attribution 4.0 International License, arXiv: 1806.05645v1[cs.CL], pp. 15 (Year: 2018).*

Khot et al., "SciTail: A Textual Entailment Dataset from Science Question Answering", Copyright (c) 2018, Association for the Advancement of Artificial Intelligence (www.aaai.org), The Thirty-Second AAAI Conference on Artificial Intelligence (AAAI-18), pp. 9 (Year: 2018).*

Kotlerman et al., "Textual Entailment Graphs", Jan. 28, 2015, Natural Language Engineering 1(1): 000-000, Printed in the United Kingdom (c) 1998 Cambridge University Press, pp. 25 (Year: 2015).*

Laura Chiticariu et al., "Transparent Machine Learning for Information Extraction", Conference on Empirical Methods in Natural Language Processing, EMNLP, Lisbon 2015, IBM 2015. 259 pages.

Tim Rocktaschel et al., "Reasoning About Entailment with Neural Attention", published as a conference paper at ICLR 2016, Mar. 1, 2016, pp. 1-9.

Matt Gardner et al., "AllenNLP: A Deep Semantic Natural Language Processing Platform", May 31, 2018, 6 pages.

Page et al., "The PageRank Citation Ranking: Bringing Order to the Web", Jan. 29, 1998, 17 pages.

David Ferrucci et al., "Building Watson: An Overview of the DeepQA Project", Association for the Advancement of Artificial Intelligence, Fall 2010, pp. 59-79.

Ido Dagan et al., "Recognizing Textual Entailment: Models and Applications", 2015 Association for Computational Linguistics, vol. 41, No. 1, 4 pages.

Ankur P. Parikh et al., "A Decomposable Attention Model for Natural Language Inference", Proceedings of the 2016 Conference on Empirical Methos in Natural Language Processing, pp. 2249-2255, Austin, Texas, Nov. 1-5, 2016.

Pranav Rajpurkar el al., "SQuAD: 100,000+ Questions for Machine Comprehension of Text", Proceedings of the 2016 Conference on Empirical Methos in Natural Language Processing, pp. 2383-2392, Austin, Texas, Nov. 1-5, 2016.

Jeffrey Pennington et al., "GloVe: Global Vectors for Word Representation", Computer Science Department, Standord University, 2014, 12 pages.

Chris Burges et al., "Learning to Rank using Gradient Descent", Appearing in Proceedings of the 22nd International Conference on Machine Learning, Bonn, Germany, 2005, 8 pages.

Ye Qi et al., "When and Why are Pre-trained Word Embeddings Useful for Neural Machine Translation?", Proceedings of NAACL-HHT 2018, pp. 529-535, Louisiana, Jun. 1-6, 2018.

Erik Cambria et al., "Jumping NLP Curves: A Review of Natural Language Processing Reserach", IEEE Computational Intelligence Magazine, May 2014, pp. 48-57.

Mark Sammons et al., "Ask not what Textual Entailment can do for You . . . ", Proceedings of the 48th Annual Meeting of the Association for Computational Linguistics, pp. 1199-1208, Uppsala, Sweden, Jul. 11-16, 2010.

Samuel R. Bowman et al., "A large annotated corpus for learning natural language inference", Aug. 2015, 11 pages.

Mark Sammons et al., "Chapter 1: Recognizing Textual Entailment", 2012, 62 pages.

* cited by examiner

TEXTUAL ENTAILMENT

BACKGROUND

Textual entailment relates to a directional relationship between text fragments in a text document, based on a natural language processing operation. The directional relationship in textual entailment may be based on mimicking cognitive comprehension of a human being. For example, the directional relationship may hold whenever the truth of one text fragment follows from another text fragment.

Many approaches have been considered for textual entailment. These approaches include, for example, word embedding, logical models, graphical models, rule systems, contextual focusing, evaluating a surface syntax, evaluation lexical relationships, and machine learning. These approaches may be based on a natural language understanding and may suffer from multi-dimensional characteristics of a natural language. For example, a characteristic of natural language may be that there are various ways of interpreting a single text and that the same meaning may be implied by different texts. Such variability of semantic expression may be due to language ambiguity, which may result in a multi-directional mapping between language expressions and meanings. The task of textual entailment may involve recognizing when two texts have the same meaning and creating a similar or shorter text that may express almost the same information.

Various methods that may presently be used for textual entailment may establish a unidirectional relationship between language expressions and meanings. Additionally, mathematical solutions to establish textual entailment may be based on the directional property of this unidirectional relationship, by making a comparison between directional similarities of the texts involved. Such an approach may render currently available mathematical solutions ineffective in dealing with the multi-dimensional characteristic of a natural language.

Therefore, to ensure efficiency and completeness, an entailment technique may be required to ensure that a multi-directional relationship may be established between language expressions and corresponding interpretations. There is a need for an entailment system, which may transform the entailment operations into an insight-driven entailment function. Further, it may be required to adaptively generate a hypothesis from a text fragment from a given text document and test the hypothesis for being positively, negatively, or neutrally conditioned onto the given text. Additionally, there may be a requirement for using an analytics centric approach for gathering insights from a document using entailment operations.

Accordingly, a technical problem with the currently available systems for generation of textual entailment is that they may be inefficient, inaccurate, and/or not scalable. There is a need for a textual entailment system that may account for the various factors mentioned above, amongst others, for multi-dimensional relationships between various text fragments from a text document in an efficient, and cost-effective manner.

DETAILED DESCRIPTION

Figure 1:
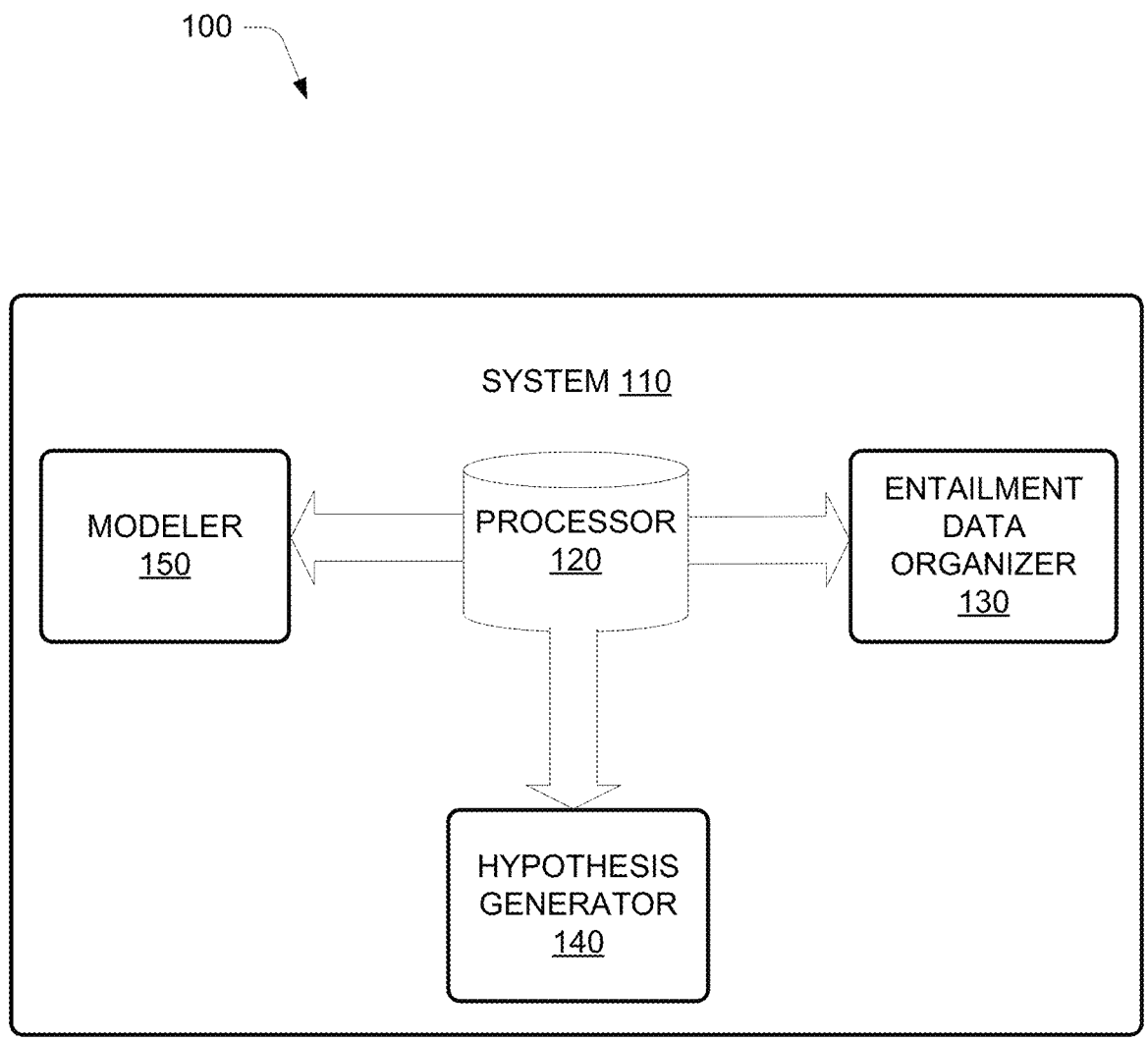
FIG. 1 illustrates a diagram for a textual entailment system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes systems and methods for a textual entailment including a textual entailment system. The textual entailment system (referred to as "system"

hereinafter) may be used to generate entailment inferences from a given text. The entailment generation may have applications in a variety of industry domains, such as, for example, healthcare, finance, and technology (web search), pharmacovigilance and the like. The entailment may capture semantic reasoning abilities used in a broad set of applications like question answering, information retrieval, information extraction, text summarization, and machine comprehension. The system may generate a plurality of hypothesis for a given text. The system may deploy a three-dimensional approach for recognizing textual entailment (RTE). The RTE may be the ability to determine if a hypothesis entails a given text. The system may generate a multi-directional between a text and the plurality of hypothesis. In an example, the system may generate an entailment relationship, a contradiction relationship, and a neutrality relationship between a text and the plurality of hypothesis. The system may deploy various word vector models for RTE. In accordance with various embodiments of the present disclosure, the system may be a neural network model for deriving textual entailment using word vectors from various models, for example, Word2vec® and Gensim®. The system may provide an improvement in entailment classification using deep learning networks to ingest natural language text using random initialization to train a set of embeddings as well as pre-trained embeddings.

The system may include a processor, an entailment data organizer, a hypothesis generator, and a modeler. The processor may be coupled to the entailment data organizer, the hypothesis generator, and the modeler. The entailment data organizer may obtain a query from a user. The query may be indicating a data entailment requirement comprising entailment data and associated with entailment operations. The entailment data organizer may implement an artificial intelligence component to identify a word index from a knowledge database. The word index maybe including a plurality of words being associated with the data entailment requirement. The entailment data organizer may implement an artificial intelligence component to identify a premise from the entailment data. The premise may be comprising a first word data set associated with the data entailment requirement. The entailment data organizer may implement an artificial intelligence component to determine a premise index by mapping the first word data set with the word index.

The hypothesis generator may implement a first cognitive learning operation to determine a plurality of hypothesis corresponding to the premise. In accordance with various embodiments of the present disclosure, each of the plurality of hypothesis may be comprising a second-word data set and indicating an inference associated with the premise. The second-word data set may be associated with the word index. The hypothesis generator may determine a hypothesis index by mapping the second-word data set with the word index. The hypothesis generator may generate a confidence index for each of the plurality of hypothesis based on a comparison of the hypothesis index with the premise index.

The modeler implement may a second cognitive learning operation to determine an entailment value based on the confidence index for each of the plurality of hypothesis. The entailment value may be indicating a probability of a hypothesis from the plurality of hypothesis being positively associated with the premise. The modeler implement may the second cognitive learning operation to determine a contradiction value from the confidence index for each of the plurality of hypothesis. The contradiction value may be indicating a probability of a hypothesis from the plurality of hypothesis being negatively associated with the premise. The modeler implement may the second cognitive learning operation to determine a neutral entailment value from the confidence index for each of the plurality of hypothesis. The neutral entailment value indicating a probability of a hypothesis from the plurality of hypothesis being neutrally associated with the premise. The modeler implement may the second cognitive learning operation to determine an entailed output index by collating the entailment value, the contradiction value, and the neutral entailment value for each of the plurality of hypothesis. The modeler implement may the second cognitive learning operation to generate an entailment result relevant for resolving the query. The entailment result may be comprising the plurality of hypothesis along with the corresponding entailed output index.

The embodiments for the data entailment requirement presented herein are exemplary in nature and should be treated as such. For the sake of brevity and technical clarity, the description of the textual entailment system may be restricted to few exemplary embodiments, however, to a person skilled in the art it should be clear that the system may be used for the fulfillment of various textual insight generations and data entailment requirements other than those mentioned hereinafter.

Accordingly, the present disclosure aims to provide a textual entailment system that may account for the various factors mentioned above, amongst others, to multi-dimensional relationships between various text fragments from a text document in an efficient, and cost-effective manner. Furthermore, the present disclosure may categorically analyze various parameters that may have an impact on deciding an appropriate entailment relationship amongst various text fragments from a given text document.

FIG. 1 illustrates a system for textual entailment system 110 (referred to as system 110 hereinafter), according to an example implementation of the present disclosure. In an example, the system 110 may include a processor 120. The processor 120 may be coupled to an entailment data organizer 130, a hypothesis generator 140 and a modeler 150.

In accordance with an embodiment of the present disclosure. The entailment data organizer 130 may obtain a query from a user. The query may be indicating a data entailment requirement comprising entailment data and associated with entailment operations. The entailment data may be a text document provided by a user to the system. The data entailment requirement may be associated with at least one of a process, an organization, and an industry-relevant for entailment operations. In an example, the data entailment requirement may indicate a requirement, which may refer to a purpose of generating insights from a text document in an automated manner. For example, the purpose may be to monitor the effects of the drugs after they may be licensed for use, in order to identify and evaluate previously unreported adverse events/reactions. In an example, adverse events related to a drug may be reported to drug makers by, for example, a doctor as a medical literature document. The medical literature document may be a complex document describing case details and various related entities. It may contain patient demographic details, medical history, description of the adverse events and the medications used, other related medical cases, and the like. In addition to identifying various entities it may also be important to identify or establish the relationship between various key entities.

The textual entailment may facilitate in providing an answer to key questions about a drug's role in a case or whether there is a causal relationship between a suspect drug and adverse event from the medical literature. The purpose of the data entailment requirement may be to understand and evaluate possible demographic regions or a geographical location by an organization for augmenting understanding regarding market requirements so as to adopt a more insight-driven approach towards sales and marketing. The purpose of the data entailment requirement may be to analyze various finance dossiers for generating insights related to various financial operations. The purpose of the data entailment requirement may be to capture semantic reasoning abilities, which may be used in a broad set of applications like question answering, information retrieval, information extraction, text summarization, and machine comprehension. The embodiments for the prospect assessment requirements presented herein are exemplary in nature and should be treated as such.

The entailment data organizer 130 may implement an artificial intelligence component to identify a word index from a knowledge database. In accordance with various embodiments of the present disclosure, the artificial intelligence component may include artificial intelligence techniques, for example, a Natural Language Processing (NLP) model. In an example, the NLP model may be developed using the Language Understanding Intelligent Service (LUIS). The NLP application may be development of a neural network with an attention model (described in subsequent paragraphs) using a Keras library for identifying sentences from a text document. The Keras library may refer to the Keras library written in Python™ and capable of running on top of TensorFlow, Microsoft Cognitive Toolkit, Theano, or PlaidML. The Keras library may be designed to enable development of deep neural networks. In an example, a set of Keras models may be developed using random initialization and an embedding layer as described by way of FIG. 3. In accordance with various embodiments of the present disclosure, the embedding layer may include a Keras embedding layer, a GloVe word embedding layer. For sake of brevity and technical clarity further details regarding the Keras library may be not be described herein, however, the same should be clear to a person skilled in the art.

The word index may be including a plurality of words being associated with the data entailment requirement. In an example, the knowledge database may be a natural language data directory. The knowledge database may be a pre-existing text corpus stored in the system 110. The text corpus may refer to a large and structured set of texts that may be used to do a statistical analysis, hypothesis testing, checking occurrences or validating linguistic rules within a specific language territory. In an example, the text corpus may be the Stanford Natural Language Inference (SNLI) text corpus comprising a collection of labeled sentence pairs. For the sake of brevity and technical clarity, details about the SNLI have not been mentioned herein but should be clear to a person skilled in the art. The SNLI text corpus may be used to determine an entailment, a contradiction, and a piece of neutral information for a three-way task challenge on 570,000 labeled sentence pairs. The artificial intelligence component may map a set of words from the data entailment requirement with the text corpus to identify the words index. The word index may include the plurality of words, which may be present in the data entailment requirement and may be present as labeled sentence pairs in the text corpus.

The entailment data organizer 130 may implement an artificial intelligence component to identify a premise from the entailment data. As mentioned above, the entailment data may be a text document provided by a user to the system. In an example, the entailment data may include medical literature related to a medical product, medical records related to various patients suffering from a medical condition, pharmacovigilance agreements, various customer interactions, and product dossiers. In accordance with various embodiments of the present disclosure, the entailment data may be in a portable document format (pdf), a doc/docx format, a txt format, a text from webscraper format, a rich text format (RTF), a Hypertext Markup Language (HTML) format. For sake of brevity and technical clarity, other formats of the entailment data have not been mentioned herein, by should be clear to a person skilled in the art. The premise may be comprising a first word data set associated with the data entailment requirement. In an example, the premise may be a text fragment segmented from the entailment data by the entailment data organizer 130. The premise may be the text fragment from the entailment data, which may be identified by the artificial intelligence component for generating an entailment insight. In an example, the entailment data organizer 130 may identify multiple premises for a given text document.

The first word data set included in the premise may be a set of words that may form the text fragment, which may be identified as the premise by the artificial intelligence component. In an example, the premise identified from the entailment data comprising a text document may be "treatment for angina pectoris with dipyridamole 220 mg daily and verapamil 120 mg daily had been started three months and two weeks previously, respectively". The first word data set for the premise may include words such as "treatment", "for", "angina", "pectoris", "with", "dipyridamole", "220", "mg", "daily", "and", "verapamil", "120", "mg", "daily", "had", "been", "started", "three", "months", "and", "two", "weeks", "previously", "respectively". In an example, the premise may be "on 20 May 2016, the patient started therapy with Provas (valsartan), tablet, at 80 mg once daily via oral route for hypertension. On 20 Mar. 2018, the patient was hospitalized for Myocardial infarction and congestive cardiac failure. The patient was died on the same day due to Myocardial infarction". The first word data set the premise may include words such as "patient", "started", "therapy", "with", "Proves", "valsartan", "tablet", "at", "80", "mg", "once", "daily", "via", "oral", "route", "for", "hypertension", "20 May 2016", "20 Mar. 2018", "patient", "was", "hospitalized", "Myocardial", "infarction", "and", "congestive", "cardiac", "failure".

The entailment data organizer 130 may implement an artificial intelligence component to determine a premise index by mapping the first word data set with the word index. In an example, the premise index may include a two-dimensional mapping of the first word data set with the word index. The premise index may enable the system 110 to automatically interpret the plurality of words present in the premise for insight generation. As mentioned above, the word index may be derived from the knowledge database that may include the text corpus with pre-existing structured set of texts and linguistic rules. A mapping of the words index with the first word data set may be lead to interpretation of the first word data set. In an example, the attention model (mentioned above) may identify a premise from the entailment data and turn them into a matrix wherein, the first set of words from the plurality of words from the premise may form a column, and the words from the word index may form a row. The attention model may make matches between the row and the column for identifying relevant context.

The hypothesis generator 140 may implement a first cognitive learning operation to determine a plurality of hypothesis corresponding to the premise. The first cognitive learning operation may include implementing various machine learning techniques such as word embedding algorithms like Glove, Keras embedding algorithm and the like. In an example, various machine learning algorithms such as TensorFlow, SpaCy, PyTorch and the like may be used for deriving a decomposable attention model. In an example, the decomposable attention model may be a recurrent Neural Network-based attention model. The Recurrent Neural Network (RNN) may be a type of Neural Network where the output from a previous step may be fed as input to a current step. The RNN may be deployed to predict the next word of a sentence, the previous words are required and hence there may be a need to remember the previous words. The system 110 may deploy various RNN based models as part of the first cognitive learning operation for generation of the plurality of hypothesis corresponding to the premise. In an example, the hypothesis generator 140 may identify the plurality of hypothesis corresponding to each of the premises identified by the entailment data organizer 130 for a given entailment data.

In accordance with various embodiments of the present disclosure, each of the plurality of hypothesis may be comprising a second-word data set and indicating an inference associated with the premise. The inference may indicate an implication, which may be derived by the hypothesis generator 140 based on the context derived through the premise index. As mentioned above, the premise index may facilitate generation of the context for the premise by mapping the first word data set with word index. The hypothesis generator 140 may deploy the context of the premise to generate the plurality of hypothesis corresponding to the premise. Each of the plurality of hypothesis may include the second-word data set. The second-word data set may be associated with the word index. As mentioned above, the word index may a pre-existing text corpus with labeled sentence pairs and linguistic rules. The second-word data set may be a set of words identified by the hypothesis generator 140 from the word index based on the context of the premise as identified by the premise index to convey an implication of the context of the premise. The hypothesis generator 140 may determine a hypothesis index by mapping the second-word data set with the word index. In an example, the hypothesis index may include a two-dimensional mapping of the second-word data set with the word index (explained in detail by way of subsequent FIGS.). The hypothesis index may enable the system 110 to automatically interpret the second-word data set present in the hypothesis for entailment generation.

The hypothesis generator 140 may generate a confidence index for each of the plurality of hypothesis based on a comparison of the hypothesis index with the premise index. As mentioned above, the premise index may compare the first data set with the word index and the hypothesis index may compare the second-word data set with the word index, wherein the word index may be a pre-existing text corpus with a defined context. Therefore, a comparison between the premise index and the hypothesis index may provide a comparison between a context as derived from the premise in regard to a context as derived from the hypothesis. Such a comparison may facilitate the generation of the confidence index for the hypothesis. The hypothesis generator 140 may allocate a high confidence index to the hypothesis that may have a context closely matching the context of the premise. The hypothesis generator 140 may allocate a low confidence index to the hypothesis that may have a context not matching the context of the premise. In an example, the hypothesis generator 140 may deploy a T-distributed Stochastic Neighbor Embedding (t-SNE) technique wherein similar objects are modeled by nearby points and dissimilar objects are modeled by distant points with high probability.

In accordance with various embodiments of the present disclosure, the hypothesis generator 140 may generate a premise graph and a hypothesis graph. The premise graph may be mapping the first word data set against the second-word data set, and the hypothesis graph mapping the second-word data set against the first word data set. As mentioned above, the premise index may compare the first data set with the word index and the hypothesis index may compare the second-word data set with the word index, wherein the word index may be a pre-existing text corpus with a defined context. The hypothesis generator 140 may map a set of words from the first word data set with a set of words from the second-word data set to derive a relationship between the words present in the premise with regard to words present in the hypothesis in form of the premise graph. The premise graph may facilitate in establishing a relationship between the premise and a hypothesis from the plurality of hypothesis. The hypothesis generator 140 may evaluate the relationship between the premise and a hypothesis from the plurality of hypothesis for allocating the confidence index to the hypothesis. In an example, the hypothesis generator 140 may deploy a T-distributed Stochastic Neighbor Embedding (t-SNE) technique for evaluating the premise graph. The hypothesis generator 140 may map a set of words from the second-word data set with a set of words from the first word data set to derive a relationship between the words present in a hypothesis from the plurality of hypothesis with regard to words present in the premise in form of the hypothesis graph. The hypothesis generator 140 may evaluate the relationship between the words present in a hypothesis from the plurality of hypothesis with regard to words present in the premise for allocating the confidence index to the hypothesis. In an example, the hypothesis generator 140 may deploy a T-distributed Stochastic Neighbor Embedding (t-SNE) technique for evaluating the hypothesis graph. In an example, the hypothesis generator 140 may compare the premise graph and the hypothesis graph for a hypothesis for allocating the confidence index to the hypothesis with regard to the premise (explained in detail by way of FIG. 6).

The modeler 150 implement may a second cognitive learning operation to determine an entailment value based on the confidence index for each of the plurality of hypothesis. In an example, the second cognitive learning operation may be the NLP model deploying various word embedding techniques, for example, Word2vec® and Glove® vectors to train a neural network to determine if a hypothesis entails a text. In an example, a long short-term memory (LSTM) model may be used to determine an entailment value (explained in detail by the way of subsequent FIGS.). In an example, a Bi-directional Long Short-Term Memory (BiLSTM) model may be used to determine an entailment value (explained in detail by the way of subsequent FIGS.). In an example, a Keras Embedding layer may be used to train the system 110. In an example, the Keras Embedding layer may be initialized using the Glove® word embeddings. The premise index and the hypothesis index may be concatenated to input to the Keras network. The BiLSTM may be deployed to return sequence values as dotted to obtain an attention layer. The sequence values may be fed as an input to a stack of three 400D® Dense layers. The output may be flattened and fed to a softmax® bottom layer to derive the entailment value (explained in detail by way of subsequent FIGS.). The entailment value may be indicating a probability of a hypothesis from the plurality of hypothesis being positively associated with the premise (explained in detail by way of FIG. 2).

The modeler 150 implement may the second cognitive learning operation to determine a contradiction value from the confidence index for each of the plurality of hypothesis. The contradiction value may be indicating a probability of a hypothesis from the plurality of hypothesis being negatively associated with the premise (explained in detail by way of FIG. 2). The modeler 150 implement may the second cognitive learning operation to determine a neutral entailment value from the confidence index for each of the plurality of hypothesis. The neutral entailment value indicating a probability of a hypothesis from the plurality of hypothesis being neutrally associated with the premise (explained in detail by way of FIG. 2). The modeler 150 may deploy the same techniques for derivation of the contradiction value and the neutral entailment value as has been described for the derivation of the entailment value.

The modeler 150 implement may the second cognitive learning operation to determine an entailed output index by collating the entailment value, the contradiction value, and the neutral entailment value for each of the plurality of hypothesis. The modeler 150 may determine the entailment value, the contradiction value, and the neutral entailment value for each of the plurality of hypothesis and compare the same. In an example, the modeler 150 may implement the second cognitive learning operation for identifying the highest value amongst the entailment value, the contradiction value, and the neutral entailment value for each of the plurality of hypothesis. For example, entailment value for a hypothesis may be "94.8", the contradiction value for a hypothesis may be "0", and the neutral entailment value may be "4.1". The modeler 150 may present all three of the entailment value, the contradiction value, and the neutral entailment value to a user of the system 110. In an example, the modeler 150 may compare all three of the entailment value, the contradiction value, and the neutral entailment value and present the highest value to a user of the system 110. The modeler 150 implement may the second cognitive learning operation to generate an entailment result relevant for resolving the query. The entailment result may be comprising the plurality of hypothesis along with the corresponding entailed output index. In an example, the entailment result may further include an entailment output corresponding to the highest value from the entailed output index associated with each of the plurality of hypothesis (explained in detail by way of FIG. 2).

In accordance with various embodiments of the present disclosure, the entailment data organizer 130 may further establish an entailment data library by associating entailment data with the premise, the plurality of hypothesis and the confidence index for each of the plurality of hypothesis. The system 110 may deploy inputs from the entailment data library for improving the efficiency of the first cognitive learning operation and the second cognitive learning operation.

The embodiments for the artificial intelligence component, the first cognitive learning operations, and the second cognitive learning operations presented herein are exemplary in nature and should be treated as such. For the sake of brevity and technical clarity, the description of the textual entailment system may be restricted to few exemplary embodiments, however, to a person skilled in the art it should be clear that the system may be used for the fulfillment of various textual entailment requirements other than those mentioned hereinafter.

Figure 2:
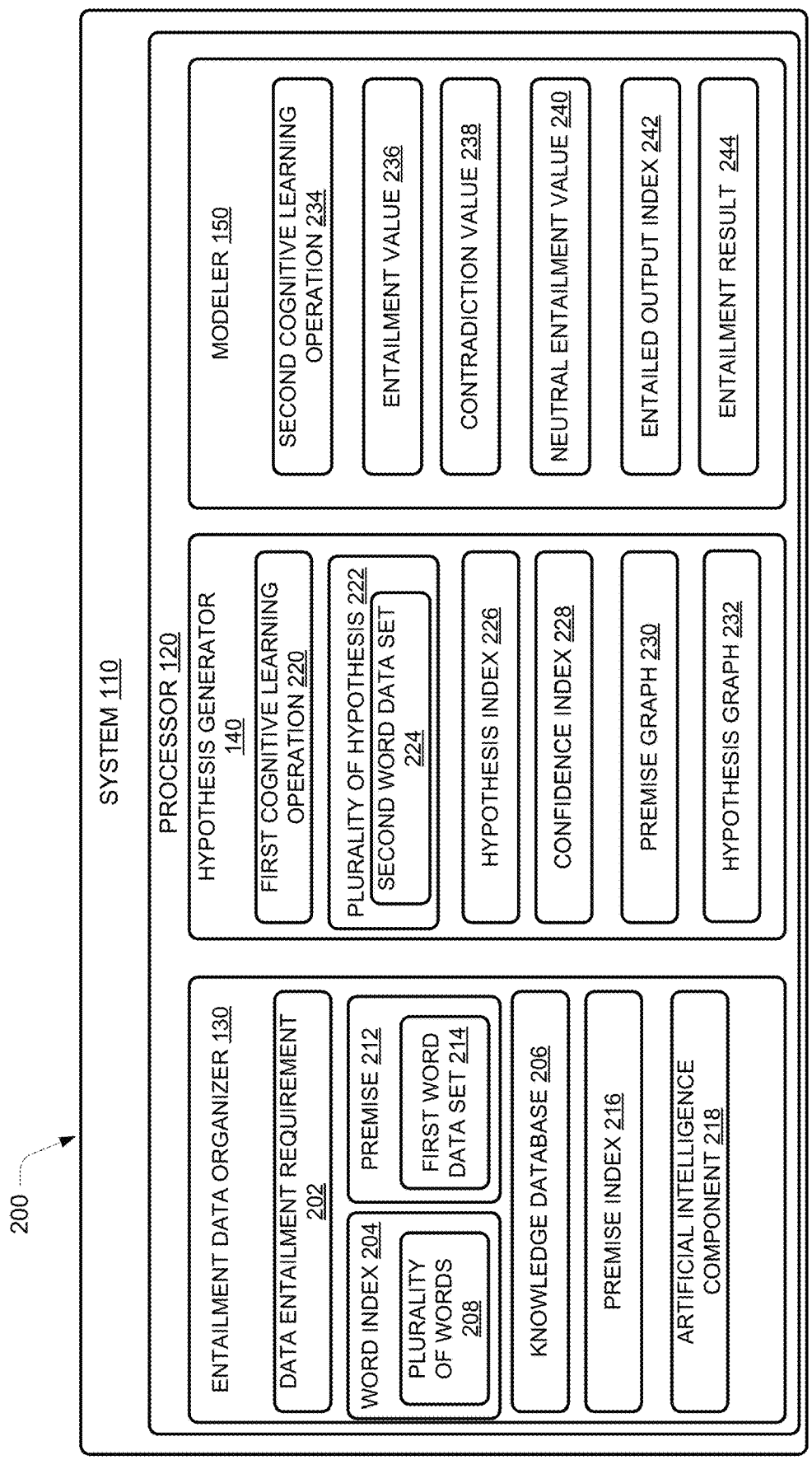
FIG. 2 illustrates various components of a textual entailment system, according to an example embodiment of the present disclosure.

FIG. 2 illustrates various components of the textual entailment system 110, according to an example embodiment of the present disclosure. In an example, the system 110 may include the processor 120. The processor 120 may be coupled to the entailment data organizer 130, the hypothesis generator 140 and the modeler 150.

In accordance with an embodiment of the present disclosure. The entailment data organizer 130 may obtain a query from a user. The query may be indicating a data entailment requirement 202 comprising entailment data and associated with entailment operations. The entailment data may be a text document provided by a user to the system. The data entailment requirement 202 may be associated with at least one of a process, an organization, and an industry-relevant for entailment operations. In an example, the data entailment requirement 202 may indicate a requirement, which may refer to a purpose of generating insights from a text document in an automated manner. For example, the purpose may be to monitor the effects of the drugs after they may be licensed for use, in order to identify and evaluate previously unreported adverse events/reactions. In an example, adverse events related to a drug may be reported to drug makers by, for example, a doctor as a medical literature document. The medical literature document may be a complex document describing case details and various related entities. It may contain patient demographic details, medical history, description of the adverse events and the medications used, other related medical cases, and the like. In addition to identifying various entities it may also be important to identify or establish the relationship between various key entities. The textual entailment may facilitate in providing an answer to key questions about a drug's role in a case or whether there is a causal relationship between a suspect drug and adverse event from the medical literature. The purpose of the data entailment requirement 202 may be to understand and evaluate possible demographic regions or a geographical location by an organization for augmenting understanding regarding market requirements so as to adopt a more insight-driven approach towards sales and marketing. The purpose of the data entailment requirement 202 may be to analyze various finance dossiers for generating insights related to various financial operations. The purpose of the data entailment requirement 202 may be to capture semantic reasoning abilities, which may be used in a broad set of applications like question answering, information retrieval, information extraction, text summarization, and machine comprehension. The embodiments for the prospect assessment requirements presented herein are exemplary in nature and should be treated as such.

The entailment data organizer 130 may implement an artificial intelligence component 218 to identify a word index 204 from a knowledge database 206. In accordance with various embodiments of the present disclosure, the artificial intelligence component 218 may include artificial intelligence techniques, for example, a Natural Language Processing (NLP) model. In an example, the NLP model may be developed using the Language Understanding Intelligent Service (LUIS). The NLP application may be development of a neural network with an attention model (described in subsequent paragraphs) using a Keras library for identifying sentences from a text document. The Keras library may refer to the Keras library written in Python™ and capable of running on top of TensorFlow, Microsoft Cognitive Toolkit, Theano, or PlaidML. The Keras library may be designed to enable development of deep neural networks. In an example, a set of Keras models may be developed using random initialization and an embedding layer as described by way of FIG. 3. In accordance with various embodiments of the present disclosure, the embedding layer may include a Keras embedding layer, a GloVe word embedding layer. For sake of brevity and technical clarity further details regarding the Keras library may be not be described herein, however, the same should be clear to a person skilled in the art.

The word index 204 may be including a plurality of words 208 being associated with the data entailment requirement 202. In an example, the knowledge database 206 may be a natural language data directory. The knowledge database 206 may be a pre-existing text corpus stored in the system 110. The text corpus may refer to a large and structured set of texts that may be used to do a statistical analysis, hypothesis testing, checking occurrences or validating linguistic rules within a specific language territory. In an example, the text corpus may be the Stanford Natural Language Inference (SNLI) text corpus comprising a collection of labeled sentence pairs. For the sake of brevity and technical clarity, details about the SNLI have not been mentioned herein but should be clear to a person skilled in the art. The SNLI text corpus may be used to determine an entailment, a contradiction, and a piece of neutral information for a three-way task challenge on 570,000 labeled sentence pairs. The artificial intelligence component 218 may map a set of words from the data entailment requirement 202 with the text corpus to identify the words index. The word index 204 may include the plurality of words 208, which may be present in the data entailment requirement 202 and may be present as labeled sentence pairs in the text corpus.

Figure 7A:
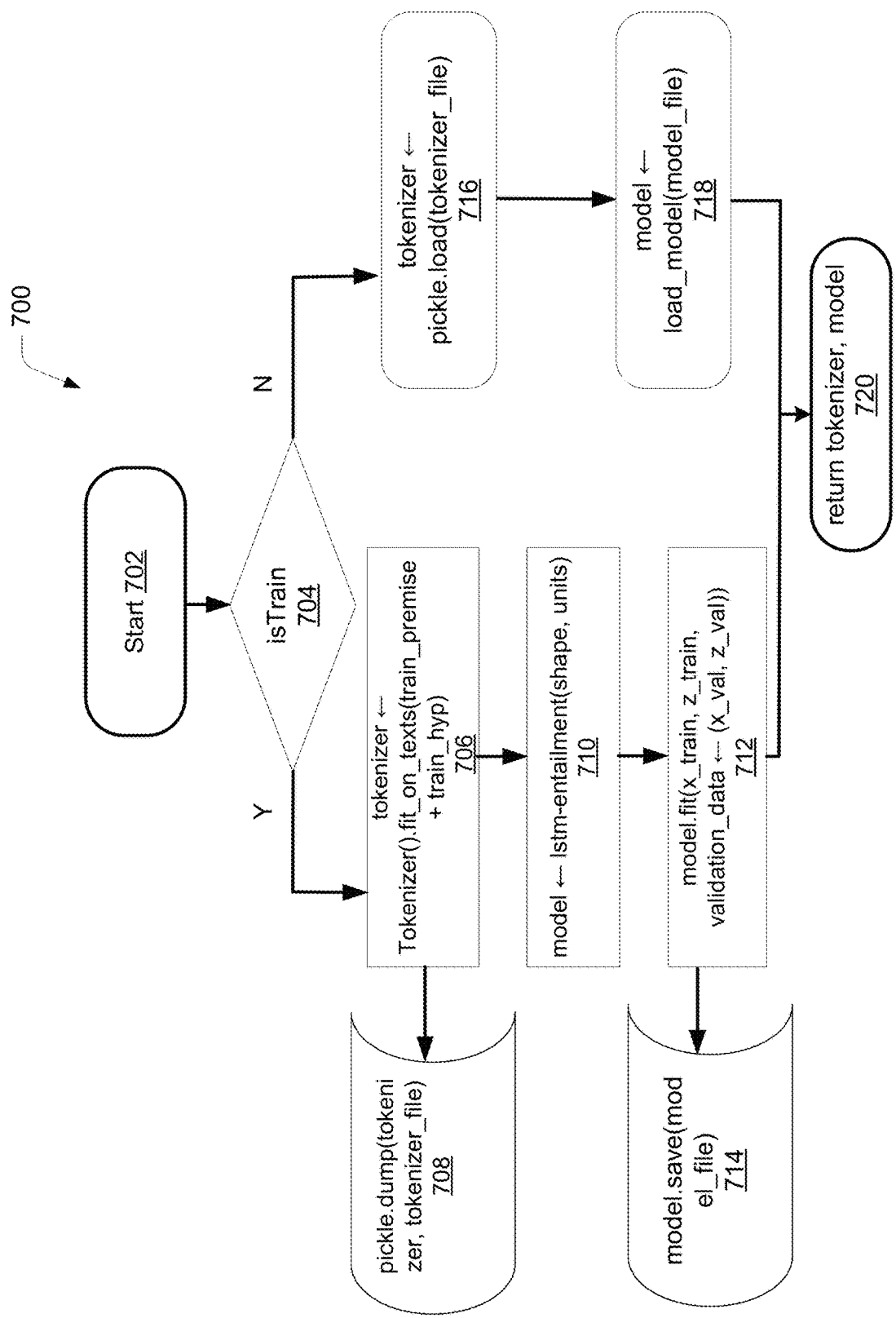
FIG. 7A illustrates a flow diagram for a tokenization operation, according to an example embodiment of the present disclosure.

The entailment data organizer 130 may implement an artificial intelligence component 218 to identify a premise 212 from the entailment data. As mentioned above, the entailment data may be a text document provided by a user to the system. In an example, the entailment data may include medical literature related to a medical product, medical records related to various patients suffering from a medical condition, pharmacovigilance agreements, various customer interactions, and product dossiers. In accordance with various embodiments of the present disclosure, the entailment data may be in a portable document format (pdf), a doc/docx format, a txt format, a text from webscraper format, a rich text format (RTF), and a hypertext markup language (HTML) format. For sake of brevity and technical clarity, other formats of the entailment data have not been mentioned herein, by should be clear to a person skilled in the art. The premise 212 may be comprising a first word data set 214 associated with the data entailment requirement 202. In an example, the premise 212 may be a text fragment segmented from the entailment data by the entailment data organizer 130. The premise 212 may be the text fragment from the entailment data, which may be identified by the artificial intelligence component 218 for generating an entailment insight. In an example, the entailment data organizer 130 may identify multiple premises 212 for a given text document. In accordance with various embodiments of the present disclosure, the premise 212 may be generated using a tokenization operation (explained in detail by way of FIGS. 7A and 7B). The tokenization operation may refer to a process of dividing text into a set of meaningful pieces. The premise 212 may be referred to as a token, which may be an instance of a sequence of characters in a particular document that may be grouped together as a useful semantic unit for processing.

The first word data set 214 included in the premise 212 may be a set of words that may form the text fragment, which may be identified as the premise 212 by the artificial intelligence component 218. In an example, the premise 212 identified from the entailment data comprising a text document may be "treatment for angina pectoris with dipyridamole 220 mg daily and verapamil 120 mg daily had been started three months and two weeks previously, respectively". The first word data set 214 for the premise 212 may include words such as "treatment", "for", "angina", "pectoris", "with", "dipyridamole", "220", "mg", "daily", "and", "verapamil", "120", "mg", "daily", "had", "been", "started", "three", "months", "and", "two", "weeks", "previously", "respectively". In an example, the premise 212 may be "on 20 May 2016, the patient started therapy with Provas (valsartan), tablet, at 80 mg once daily via oral route for hypertension. On 20 Mar. 2018, the patient was hospitalized for Myocardial infarction and congestive cardiac failure. The patient was died on the same day due to Myocardial infarction". The first word data set 214 the premise 212 may include words such as "patient", "started", "therapy", "with", "Provas", "valsartan", "tablet", "at", "80", "mg", "once", "daily", "via", "oral", "route", "for", "hypertension", "20 May 2016", "20 Mar. 2018", "patient", "was", "hospitalized", "Myocardial", "infarction", "and", "congestive", "cardiac", "failure".

The entailment data organizer 130 may implement the artificial intelligence component 218 to determine a premise index 216 by mapping the first word data set 214 with the word index 204. In an example, the premise index 216 may include a two-dimensional mapping of the first word data set 214 with the word index 204. The premise index 216 may enable the system 110 to automatically interpret the plurality of words 208 present in the premise 212 for insight generation. As mentioned above, the word index 204 may be derived from the knowledge database 206 that may include the text corpus with pre-existing structured set of texts and linguistic rules. A mapping of the words index with the first word data set 214 may be lead to interpretation of the first word data set 214. In an example, the attention model (mentioned above) may identify the premise 212 from the entailment data and turn them into a matrix wherein, the first set of words from the plurality of words 208 from the premise 212 may form a column, and the words from the word index 204 may form a row. The attention model may make matches between the row and the column for identifying relevant context. In accordance with various embodiments of the present disclosure, the entailment data organizer 130 may implement a word embedding model as an artificial intelligence technique for mapping the words index with the first word data set 214. The system 110 may deploy a Keras 'pretrained_embedding_layer' (explained in detail by way of FIG. 4) using Glove word embeddings for mapping the words index with the first word data set 214.

The hypothesis generator 140 may implement a first cognitive learning operation 220 to determine a plurality of hypothesis 222 corresponding to the premise 212. The first cognitive learning operation 220 may include implementing various machine learning techniques such as word embedding algorithms like GloVe, Keras embedding algorithm and the like. In an example, various machine learning algorithms such as TensorFlow, SpaCy, PyTorch and the like may be used for deriving a decomposable attention model. In an example, the decomposable attention model may be a recurrent Neural Network-based attention model. The Recurrent Neural Network (RNN) may be a type of Neural Network where the output from a previous step may be fed as input to a current step. The RNN may be deployed to predict the next word of a sentence, the previous words are required and hence there may be a need to remember the previous words. The system 110 may deploy various RNN based models as part of the first cognitive learning operation 220 for generation of the plurality of hypothesis 222 corresponding to the premise 212. In an example, the hypothesis generator 140 may identify the plurality of hypothesis 222 corresponding to each of the premise 212 identified by the entailment data organizer 130 for a given entailment data.

In accordance with various embodiments of the present disclosure, each of the plurality of hypothesis 222 may be comprising a second-word data set 224 and indicating an inference associated with the premise 212. The inference may indicate an implication, which may be derived by the hypothesis generator 140 based on the context derived through the premise index 216. As mentioned above, the premise index 216 may facilitate generation of the context for the premise 212 by mapping the first word data set 214 with word index 204. The hypothesis generator 140 may deploy the context of the premise 212 to generate the plurality of hypothesis 222 corresponding to the premise 212. Each of the plurality of hypothesis 222 may include the second-word data set 224. The second-word data set 224 may be associated with the word index 204. As mentioned above, the word index 204 may a pre-existing text corpus with labeled sentence pairs and linguistic rules. The second-word data set 224 may be a set of words identified by the hypothesis generator 140 from the word index 204 based on the context of the premise 212 as identified by the premise index 216 to convey an implication of the context of the premise 212. The hypothesis generator 140 may determine a hypothesis index 226 by mapping the second-word data set 224 with the word index 204. In an example, the hypothesis index 226 may include a two-dimensional mapping of the second-word data set 224 with the word index 204 (explained in detail by way of subsequent FIGS.). The hypothesis index 226 may enable the system 110 to automatically interpret the second-word data set 224 present in the hypothesis for entailment generation.

The hypothesis generator 140 may generate a confidence index 228 for each of the plurality of hypothesis 222 based on a comparison of the hypothesis index 226 with the premise index 216. As mentioned above, the premise index 216 may compare the first data set with the word index 204 and the hypothesis index 226 may compare the second-word data set 224 with the word index 204, wherein the word index 204 may be a pre-existing text corpus with a defined context. Therefore, a comparison between the premise index 216 and the hypothesis index 226 may provide a comparison between a context as derived from the premise 212 in regard to a context as derived from the hypothesis. Such a comparison may facilitate the generation of the confidence index 228 for the hypothesis. The hypothesis generator 140 may allocate a high confidence index 228 to the hypothesis that may have a context closely matching the context of the premise 212. The hypothesis generator 140 may allocate a low confidence index 228 to the hypothesis that may have a context not matching the context of the premise 212. In an example, the hypothesis generator 140 may deploy a T-distributed Stochastic Neighbor Embedding (t-SNE) technique wherein similar objects are modeled by nearby points and dissimilar objects are modeled by distant points with high probability.

In accordance with various embodiments of the present disclosure, the hypothesis generator 140 may generate the premise graph 230 and a hypothesis graph 232. The premise graph 230 may be mapping the first word data set 214 against the second-word data set 224, and the hypothesis graph 232 mapping the second-word data set 224 against the first word data set 214. As mentioned above, the premise index 216 may compare the first data set with the word index 204 and the hypothesis index 226 may compare the second-word data set 224 with the word index 204, wherein the word index 204 may be a pre-existing text corpus with a defined context. The hypothesis generator 140 may map a set of words from the first word data set 214 with a set of words from the second-word data set 224 to derive a relationship between the words present in the premise 212 with regard to words present in the hypothesis in form of the premise graph 230. The premise graph 230 may facilitate in establishing a relationship between the premise 212 and a hypothesis from the plurality of hypothesis 222. The hypothesis generator 140 may evaluate the relationship between the premise 212 and a hypothesis from the plurality of hypothesis 222 for allocating the confidence index 228 to the hypothesis. In an example, the hypothesis generator 140 may deploy a T-distributed Stochastic Neighbor Embedding (t-SNE) technique for evaluating the premise graph 230. The hypothesis generator 140 may map a set of words from the second-word data set 224 with a set of words from the first word data set 214 to derive a relationship between the words present in a hypothesis from the plurality of hypothesis 222 with regard to words present in the premise 212 in form of the hypothesis graph 232. The hypothesis generator 140 may evaluate the relationship between the words present in a hypothesis from the plurality of hypothesis 222 with regard to words present in the premise 212 for allocating the confidence index 228 to the hypothesis. In an example, the hypothesis generator 140 may deploy a T-distributed Stochastic Neighbor Embedding (t-SNE) technique for evaluating the hypothesis graph 232. In an example, the hypothesis generator 140 may compare the premise graph 230 and the hypothesis graph 232 for a hypothesis for allocating the confidence index 228 to the hypothesis with regard to the premise 212 (explained in detail by way of FIG. 6). In accordance with various embodiments of the present disclosure, the first cognitive learning operation 220 may deploy a word embedding algorithm such as for example, the Keras 'pretrained_embedding_layer', and Glove® word embedding algorithm for determination of the plurality of hypothesis 222, hypothesis index 226, premise graph 230, and hypothesis graph 232

The modeler 150 implement may a second cognitive learning operation 234 to determine an entailment value 236 based on the confidence index 228 for each of the plurality of hypothesis 222. In an example, the second cognitive learning operation 234 may be the NLP model deploying various word embedding techniques, for example, Keras 'pretrained_embedding_layer', Word2vec and GloVe vectors to train a neural network to determine if a hypothesis entails a text. In an example, a Long short-term memory (LSTM) model may be used to determine an entailment value 236 (explained in detail by the way of subsequent FIGS.). In an example, a Bi-directional Long Short-Term Memory (BiLSTM) model may be used to determine an entailment value 236 (explained in detail by the way of subsequent FIGS.). In an example, a Keras Embedding layer may be used to train the system 110. In an example, the Keras Embedding layer may be initialized using the Glove® word embeddings. The premise index 216 and the hypothesis index 226 may be concatenated to input to the Keras network. The BiLSTM may be deployed to return the premise index 216 and the hypothesis index 226 values as dotted to obtain an attention layer. The premise index 216 and the hypothesis index 226 values may be fed as an input to a stack of three 400D® Dense layers. The output may be flattened and fed to a softmax® bottom layer to derive the entailment value 236 (explained in detail by the way of subsequent FIGS.). The entailment value 236 may be indicating a probability of a hypothesis from the plurality of hypothesis 222 being positively associated with the premise 212.

The modeler 150 implement may the second cognitive learning operation 234 to determine a contradiction value 238 from the confidence index 228 for each of the plurality of hypothesis 222. The contradiction value 238 may be indicating a probability of a hypothesis from the plurality of hypothesis 222 being negatively associated with the premise 212. The modeler 150 implement may the second cognitive learning operation 234 to determine a neutral entailment value 240 from the confidence index 228 for each of the plurality of hypothesis 222. The neutral entailment value 240 indicating a probability of a hypothesis from the plurality of hypothesis 222 being neutrally associated with the premise 212. The modeler 150 may deploy the same techniques for derivation of the contradiction value 238 and the neutral entailment value 240 as having been described for the derivation of the entailment value 236.

The modeler 150 implement may the second cognitive learning operation 234 to determine an entailed output index 242 by collating the entailment value 236, the contradiction value 238, and the neutral entailment value 240 for each of the plurality of hypothesis 222. The modeler 150 may determine the entailment value 236, the contradiction value 238, and the neutral entailment value 240 for each of the plurality of hypothesis 222 and compare the same. In an example, the modeler 150 may implement the second cognitive learning operation 234 for identifying the highest value amongst the entailment value 236, the contradiction value 238, and the neutral entailment value 240 for each of the plurality of hypothesis 222. For example, entailment value 236 for a hypothesis may be "94.8", the contradiction value 238 for a hypothesis may be "0", and the neutral entailment value 240 may be "4.1". The modeler 150 may present all three of the entailment value 236, the contradiction value 238, and the neutral entailment value 240 to a user of the system 110. In an example, the modeler 150 may compare all three of the entailment value 236, the contradiction value 238, and the neutral entailment value 240 and present the highest value to a user of the system 110. The modeler 150 implement may the second cognitive learning operation 234 to generate an entailment result 244 relevant for resolving the query. The entailment result 244 may be comprising the plurality of hypothesis 222 along with the corresponding entailed output index 242. In an example, the entailment result 244 may further include an entailment output corresponding to the highest value from the entailed output index 242 associated with each of the plurality of hypothesis 222.

In accordance with various embodiments of the present disclosure, the entailment data organizer 130 may further establish an entailment data library by associating entailment data with the premise 212, the plurality of hypothesis 222 and the confidence index 228 for each of the plurality of hypothesis 222. The system 110 may deploy inputs from the entailment data library for improving the efficiency of the first cognitive learning operation 220 and the second cognitive learning operation 234.

In operation, the system 110 may generate a set of textual entailments from a given text document. For example, the system 110 may generate insights about a particular drug from interpreting associated medical literature, patient records and the like for pharmacovigilance purposes. The system 110 may generate the set of textual entailments from a given text document through deployment of the processor 120, which may be coupled to the entailment data organizer 130, hypothesis generator 140 and the modeler 150. The entailment data organizer 130 may receive the data entailment requirement 202 and associated entailment data from a user. The entailment data may be a text document or a set of text documents. The entailment data organizer 130 may implement a tokenization operation (explained in detail by way of subsequent FIGS.) to break the entailment data into a set of meaningful fragments. The set of meaningful fragments may comprise a set of premise 212 for generation of entailment insights. The system 110 may break the premise 212 into the first word data set 214 and map the words therein with the word index 204, which may be a text corpus for developing the premise index 216. In an example, the system 110 may deploy a word embedding algorithm as part of the artificial intelligence component 218 for natural language processing aiming at mapping semantic meaning of the premise 212. This may be done by associating a numeric vector to every word in the first word data set 214 from the plurality of words 208 from the premise 212, such that the distance between any two vectors would capture part of the semantic relationship between the two associated words. The geometric space formed by these vectors may be referred as an embedding space. The knowledge database 206 may include all the words mentioned therein labeled with semantic relationships. For example, as mentioned above, the first word data set 214 for the premise 212 may include words such as "treatment", "for", "angina", "pectoris", "with", "dipyridamole", "220", "mg", "daily", "and", "verapamil", "120", "mg", "daily", "had", "been", "started", "three", "months", "and", "two", "weeks", "previously", "respectively". The artificial intelligence component 218 may deploy word embeddings to decipher that the words "angina", and "pectoris" may be syntactically related and hence they would be placed in vicinity of each other and interpreted accordingly. Additionally, the artificial intelligence component 218 may deploy word embeddings to decipher that the words "daily", "and", "verapamil" may be related in terms that one may be a drug name and another may be a drug dosage timing and therefore they may be placed and interpreted accordingly.

The system 110 may deploy the hypothesis generator 140 to generate a plurality of hypothesis 222 for the premise 212 based in the context interpreted from the premise index 216. The hypothesis generator 140 may obtain the context of the premise 212 from the entailment data organizer 130. The hypothesis generator 140 may deploy the recurrent Neural Network-based attention model and a word embedding algorithm for generating the plurality of hypothesis 222, wherein a sentence may be predicted and formed based on a previous sentence. For example, the premise 212 may be "treatment for angina pectoris with dipyridamole 220 mg daily and verapamil 120 mg daily had been started three months and two weeks previously, respectively". The hypothesis generator 140 may generate a first hypothesis as "Dipyridamole is an ongoing medication", a second hypothesis as "Dipyridamole is not an ongoing medication", a third hypothesis as "Verapamil is a concomitant drug", and a fourth hypothesis as "Verapamil is not a concomitant drug". The hypothesis generator may identify words from deploying the recurrent Neural Network-based attention model on the premise index 216 and compare it will the word index 204 for generation of the second-word data set 224 and form the plurality of hypothesis 222 therefrom.

As mentioned above, each of the plurality of hypothesis 222 may be indicating an inference associated with the premise 212. Each of the plurality of hypothesis 222 may include the second-word data set 224. The hypothesis generator 140 implements the word embedding algorithm as part of the first cognitive learning operation 220 for mapping the second-word data set 224 from hypothesis with the word index 204 for determining the hypothesis index 226. The hypothesis index 226 and premise index 216 may be compared for determining the confidence index 228 for the hypothesis. The hypothesis generator 140 may compare the hypothesis index with the premise index 216 by deploying the word embedding algorithm and mapping various words present therein (explained further by way of FIG. 6). The modeler 150 may determine the entailment value 236 based on the confidence index 228. The modeler 150 may evaluate the confidence index 228 and determine a probability of a hypothesis from the plurality of hypothesis 222 for the premise 212 may be an entailment. The probability may be referred of the entailment value 236. For example, the premise 212 may be "treatment for angina pectoris with dipyridamole 220 mg daily and verapamil 120 mg daily had been started three months and two weeks previously, respectively". The hypothesis generator 140 may generate a first hypothesis as first hypothesis as "Dipyridamole is an ongoing medication", and the second hypothesis as "Dipyridamole is not an ongoing medication". The confidence index 228 may be determined by comparing the words and present in the first hypothesis with the words present in the premise 212 along with the context of words present in the premise 212 with the context of the words present in the first hypothesis. The word "Dipyridamole" may be present in the premise 212 and the first hypothesis. The phrase "had been started three months and two weeks previously" may be mapped with the word index 204 while determining the premise index 216 and the word "ongoing" may be established by the system 110 to convey the same meaning. Hence, the word "Dipyridamole" may be positively related to the word "ongoing", while generating the first hypothesis. Additionally, the word "previously" may indicate a negative association with the word "Dipyridamole" and hence it may be negatively related to the word "ongoing" while generating the second hypothesis.

The confidence index 228 may be determined by the system 110 for the first hypothesis to include a probability of an entailment of the first hypothesis on the premise 212, a probability of a contradiction of the first hypothesis on the premise 212, and a probability of a neutral entailment of the first hypothesis on the premise 212. The probability of the entailment of the first hypothesis on the premise 212 may be referred to as the entailment value 236 for the first hypothesis. The probability of the contradiction of the first hypothesis on the premise 212 may be referred to as the contradiction value 238 for the first hypothesis. The probability of the neutral entailment of the first hypothesis on the premise 212 may be referred to as the neutral entailment value 240 for the first hypothesis. The modeler 150 may collate the entailment value 236, the contradiction value 238, and the neutral entailment value 240 for the first hypothesis for determination of the entailed output index 242. The modeler 150 may compare the entailment value 236, the contradiction value 238, and the neutral entailment value 240 from the entailed output index 242 for the first hypothesis and determine which, of these values may be highest. The modeler 150 may generate the entailment result 244 based on the value that is highest from the entailment value 236, the contradiction value 238, and the neutral entailment value 240 for the first hypothesis for the premise 212. The modeler 150 may repeat the aforementioned comparison for each of the confidence indices for each of the hypothesis and generate the entailment result 244. For example, the modeler 150 may present the first hypothesis to be an "entailment" based on the comparison of the hypothesis index 226 for the first hypothesis with the premise index 216 and subsequent confidence index 228. Additionally, the modeler 150 may present the second hypothesis to be a "contradiction" based on the comparison of the hypothesis index 226 for the second hypothesis with the premise index 216 and subsequent confidence index 228.

In accordance with various embodiments of the present disclosure, the modeler 150 may collate each of the plurality of hypothesis 222 wherein, the entailment value 236 may be the highest and present the same to the user as part of the entailment result 244.

Accordingly, the system 110 and various embodiments thereof may provide an effective and efficient entailment analysis for a text document. The system 110 may be more effective due to the use of a Keras pre-trained embedding layer along with a Glove® word embedding model implemented therein part from various other artificial intelligence techniques. The system 110 may deploy various attention layer-based algorithms for determination of the premise index 216, the hypothesis index 226, the premise graph 230, and the hypothesis graph 232.

Figure 3:
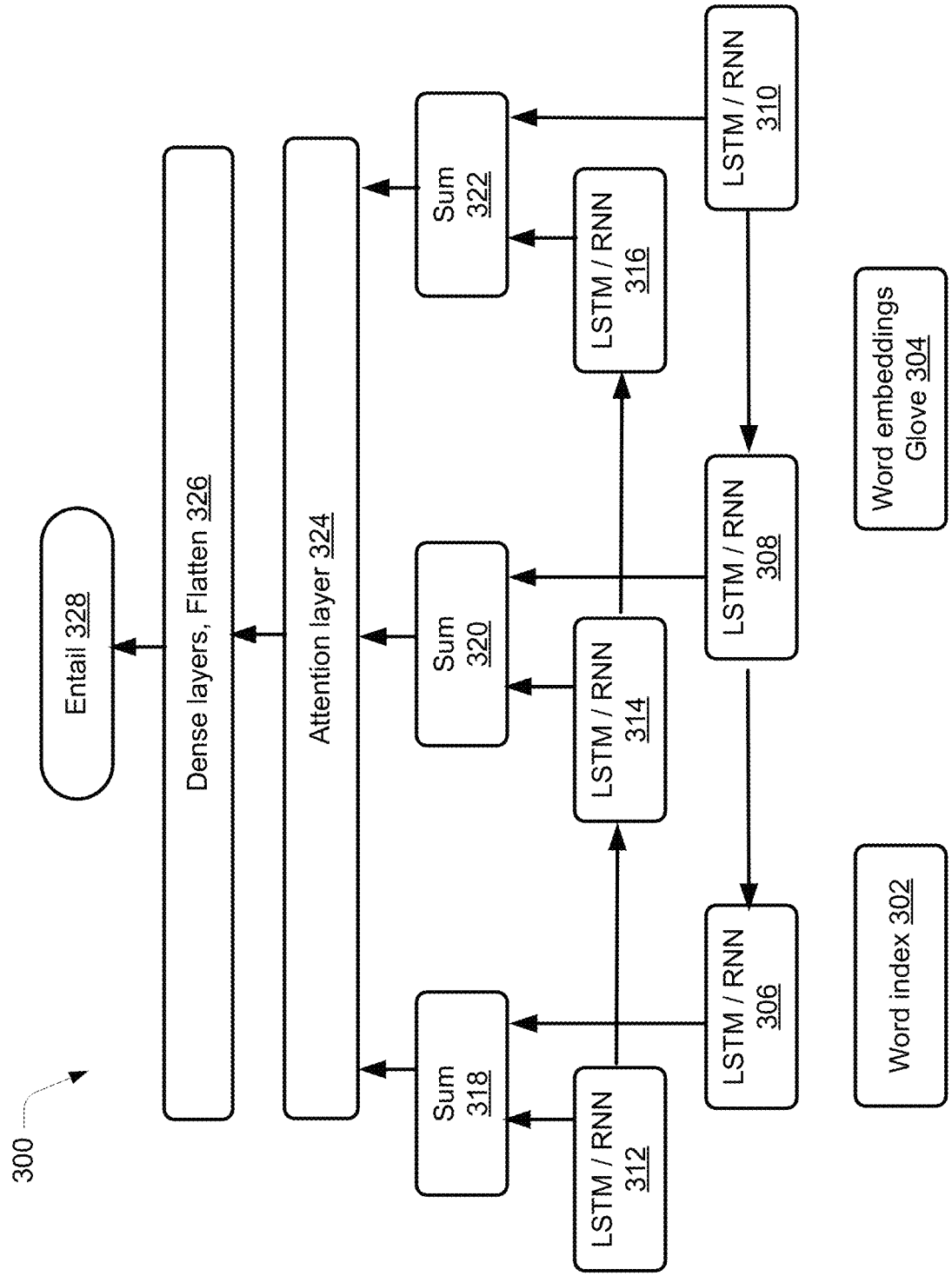
FIG. 3 illustrates a network architectural diagram for generating textual entailment using a textual entailment system, according to an example embodiment of the present disclosure.

FIG. 3 illustrates a network architectural diagram for a system 300 for generating textual entailment using a textual entailment system, according to an example embodiment of the present disclosure. Any of the components of the system 110 as described by the way of FIG. 1 and FIG. 2 may be deployed by the system 300 for generating textual entailment.

In accordance with various embodiments of the present disclosure, the system 300 may receive the data entailment requirement 202. The system 300 may deploy a recurrent neural network (RNN) for generating textual entailment. The system 300 may deploy a BiDirectional LSTM model using attention model for generating textual entailment. The BiDirectional LSTM model may process the context from the premise index 216 and the hypothesis index 226 more efficiently due to its bidirectional nature. The BiDirectional LSTM model may interpret the premise 212 in a forward direction and in a backward direction at the same time, thereby increasing the probability of a correct entailment generation. For example, if the premise 212 may be "The reporter considered the pneumonia to be related to Kemstro, sepsis to be related to Kemstro and urinary tract infection to be related to Kemstro." The BiDirectional LSTM model may map the premise 212 from beginning to end of the premise 212 sentence and from end to beginning of the premise 212 sentence simultaneously for generating a context effectively. The premise index 216 generated by deployment of the BiDirectional LSTM model may be more efficient. The system 300 may include a word index 204 302 and a word embedding component 304. In an example, the word embedding algorithm may be GloVe word embedding model. The word index 204 302 may be similar to the word index 204. The word embedding component 304 may implement any of the word embedding algorithms for processing the data entailment requirement 202. The system 300 may include a series of RNN component blocks. The RNN component blocks may include an RNN block 306, an RNN block 308, an RNN block 310, an RNN block 312, an RNN block 316, and an RNN block 318. In an example, the RNN block 306, the RNN block 308, and the RNN block 310 may map the premise 212 from an end and move towards the beginning of the premise 212 sentence. The RNN block 312, the RNN block 314, and the RNN block 316 may map the premise 212 from the beginning of the premise 212 sentence and move towards an end of the premise 212 sentence. The system 300 may include a series of summation blocks. The series of summation blocks may include a sum 318, a sum 320, and a sum 322. In an example, the sum 318 may be a summation of the interpretation from the RNN block 306 and the RNN block 312. The sum 320 may be a summation of the interpretation from the RNN block 308 and the RNN block 314. The sum 322 may be a summation of the interpretation from the RNN block 310 and the RNN block 316. The series of RNN component blocks may identify the premise 212 and may generate the plurality of hypothesis 222.

The system 300 may include an attention layer 324. The sum 318, the sum 320, and the sum 322 may provide an input to the attention layer 324. The attention layer 324 may take two sentences, turns them into a matrix where the words of one sentence form the columns, and the words of another sentence form the rows, and then it may make matches, identifying relevant context. The attention layer 324 may receive inputs from the sum 318, the sum 320, and the sum 322 to determine the premise index 216, the hypothesis index 226, the premise graph 230, and the hypothesis graph 232. In an example, the attention layer 324 may include the Keras attention layer. The system may further include a series of a dense layer 326. The dense layer 326 may be a fully connected neural network layer. For the sake of brevity and technical clarity, details information on the dense layer 326 may not be presented herein but should be clear to a person skilled in the art. In an example, the dense layer 326 may flatten the input received from the attention layer 324. The attention layer 324 may generate an output in form of a matrix with rows and columns mapped with each other. The dense layer 326 may flatten the matrix into a single column output data. The dense layer 326 may pass on the flattened single column output data to a softmax bottom layer for generating textual entailment.

Figure 4:
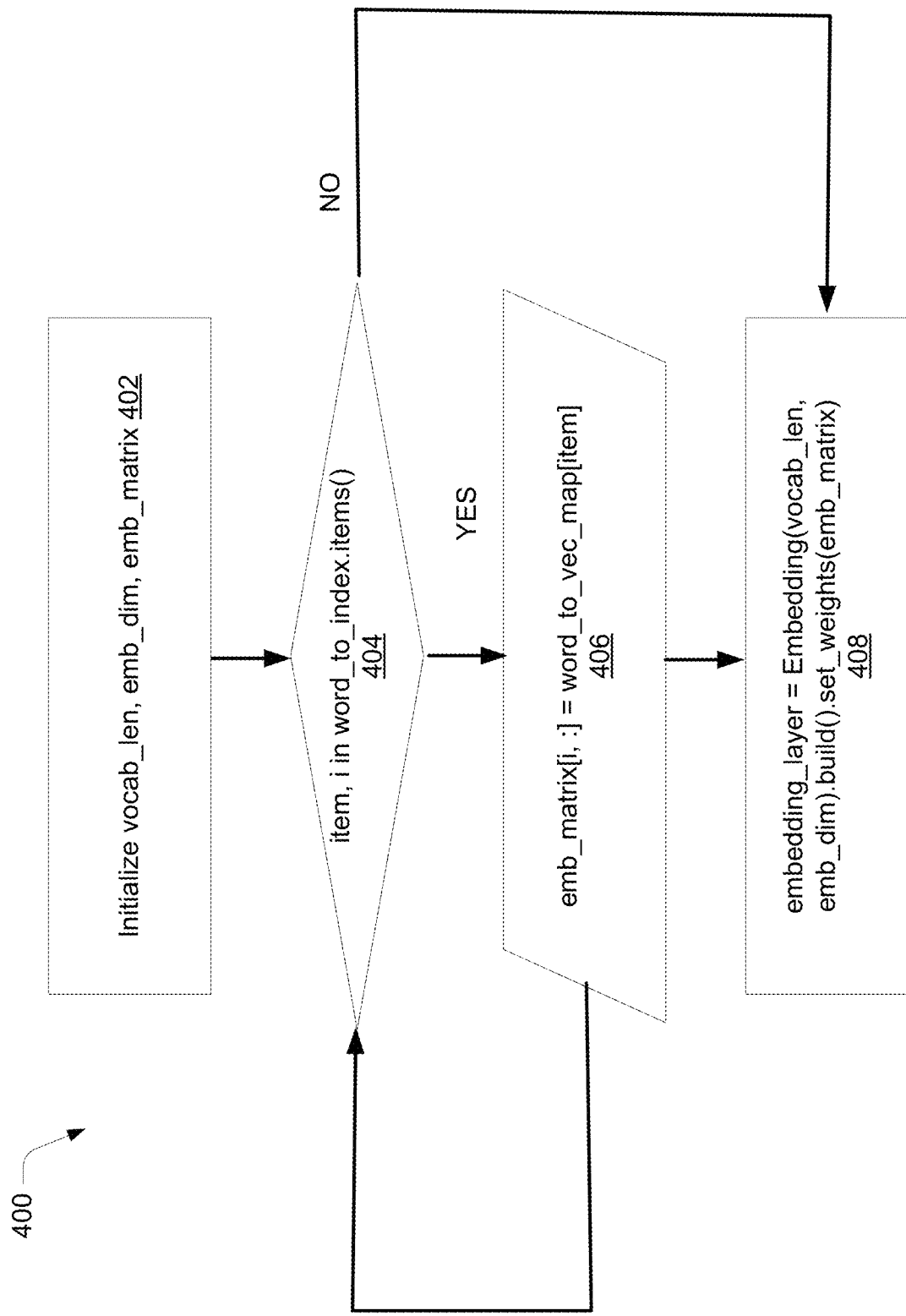
FIG. 4 illustrates a flow diagram for a configuration of a Keras embedding layer using a word index embedding for deployment of a textual entailment system, according to an example embodiment of the present disclosure.

FIG. 4 illustrates a flow diagram for a configuration of a Keras embedding layer 400 for generating textual entailment using a textual entailment system, according to an example embodiment of the present disclosure. Any of the components of the system 110 as described by the way of FIG. 1, FIG. 2 and FIG. 3 may be deployed by the Keras embedding layer 400 for generating textual entailment.

As mentioned above, the Word embeddings may be a set of natural language processing techniques aiming at mapping semantic meaning into a vector space. This may be achieved by associating a numeric vector to every word in word index 204, the premise 212, and each of the plurality of the hypothesis such that the distance between any two vectors would capture part of the semantic relationship between the two associated words. The geometric space formed by these vectors is called an embedding space. For example, "disorder" and "song" may be words that may be semantically quite different, so a reasonable embedding space may represent them as vectors that may be far apart. But "disorder" and "medication" are related words, so they may be embedded close to each other.

The Keras embedding layer 400 may include an initialization component 402. The initialization component 402 may initialize the knowledge database 206 upon receiving the data entailment requirement 202 and associated entailment data. The initialization component 402 may provide input to a decision component 404. The decision component may identify a word from the entailment data and compare it with the knowledge database 206. In an example, the decision component 404 may identify a word from the first word data set 214 and compare it with the second-word data set 224. The decision component 404 may return the input provided by the initialization component 402 to an embedding layer 408, when the word from the entailment data may not be matched with a word from the knowledge database 206. The decision component 404 may form a matrix component 406 when the word from the entailment data may be matched with a word from the knowledge database 206. In an example, the matrix component 406 may be the premise index 216, the hypothesis index 226. The matrix component 406 may pass on a matrix output to the decision component 404 for validation of the matrix created by the matrix component 406 may lead to the embedding layer 408, wherein respective weights may be provided to various words based on the mappings.

Figure 5:
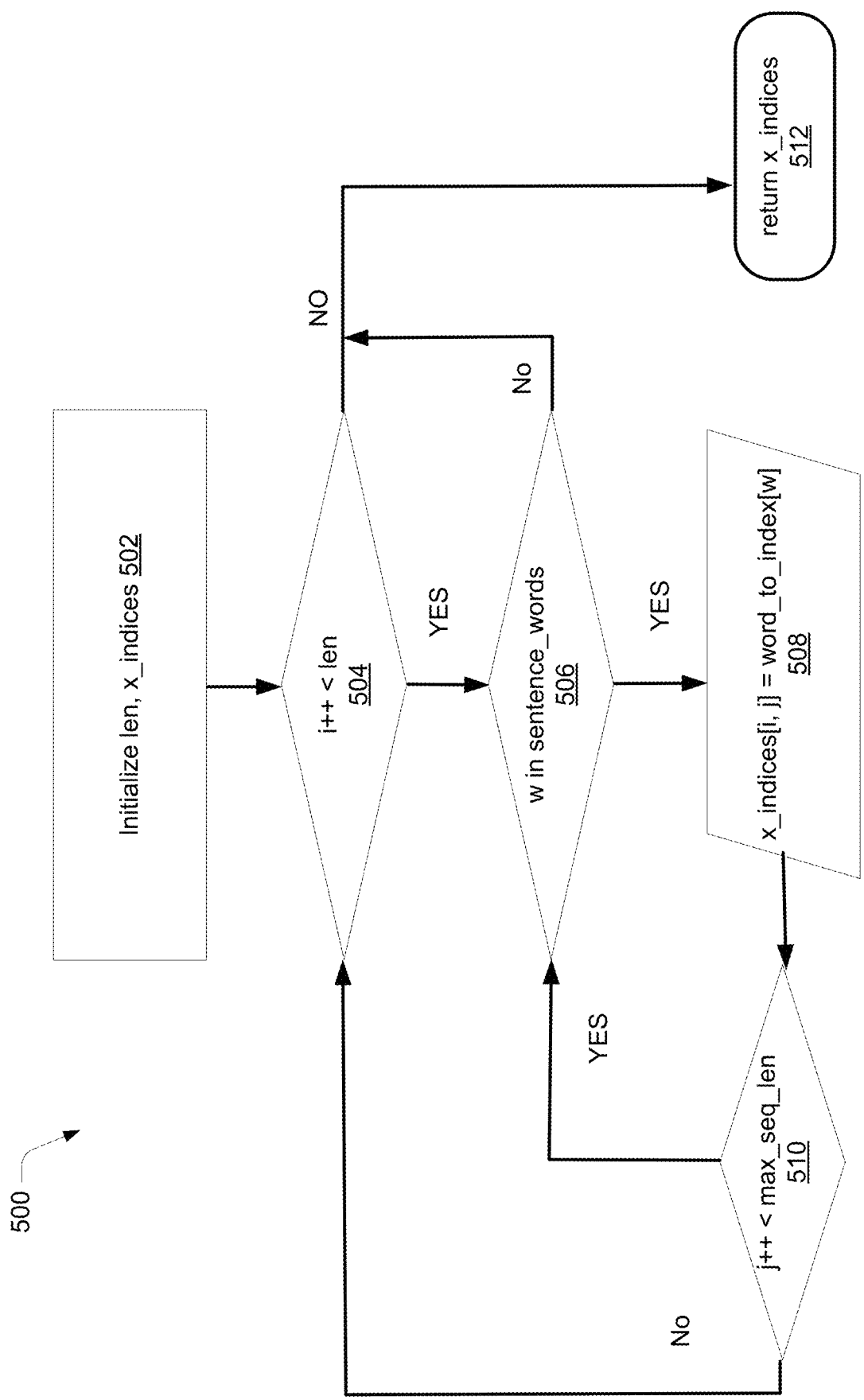
FIG. 5 illustrates a flow diagram for initializing an array of indices corresponding to a sentence of words in a word index using a textual entailment system, according to an example embodiment of the present disclosure.

FIG. 5 illustrates a flow diagram for a process 500 for initializing an array of indices corresponding to words in the word index 204 using a textual entailment system, according to an example embodiment of the present disclosure. Any of the components of the system 110 as described by the way of FIG. 1, FIG. 2, FIG. 3 and FIG. 4 may be deployed for initializing the array of indices corresponding to the sentence words in the word index 204. The process 500 may use the GloVe dictionary. The Glove® may refer to a pre-computed database of word embeddings developed by Stanford researchers in 2014. It stands for "Global Vectors for Word Representation", and it may be an embedding technique based on factorizing a matrix of word co-occurrence statistics. The process 500 deploy the Glove® embeddings in a Keras model. The process 500 may include an initialization 502. The initialization 502 may execute a "len" function and an "x_indices" function. The "len" function may refer to an inbuilt function in Python™ programming language that may return a length of the string. The "len" function may calculate number of words in the entailment data. In an example, the user may define an upper limit for the "len" function, for example, to 50 words. In such an example, the system 110 may identify the premise 212 such that each premise 212 may have less than 50 words. The "x_indices" function may refer to an array of indices corresponding to words in the sentences from a point X. The "x_indices" function may facilitate premise 212 determination from the entailment data. In an example, "x_indices" function may facilitate hypothesis determination from the premise index 216. The initialization 502 may be followed by a comparison 504, wherein an "i++<len" function may be executed. The "i" from the ""i++<len" function" may refer to a number of characters in the premise 212 identified by the initialization 502. In an example, the "i" from the ""i++<len" function" may refer to a number of characters in a hypothesis from the plurality of hypothesis 222 identified by the initialization 502. The comparison 504 may compare a number of words in the premise 212 determined by the initialization 502 with the number of words defined by upper limit for the "len" function. If the number of words in the premise 212 may be less than the upper limit for the "len" function, the process 500 may execute a word index identification 506, wherein the process may execute a "w in sentence_words" function. The ""w in sentence_words" function may identify the word index 204 for the premise 212 determined by the "x_indices" function. If the number of words in the premise 212 may not be less than the upper limit for the "len" function, the process 500 may execute a return function 512, wherein the process may execute a "return x_indices" function. The word index identification 506 may be followed by a matrix creation 508, wherein a "x_indices[1, j]=word_to_index[w]" function may be executed. The "x_indices[1, j]=word_to_index[w]" function may facilitate creation of a matrix for determination of the premise index 216 wherein, "i" may refer to the first words data set and "j" may refer to the word index 204. In an example, "x_indices[1, j]=word_to_index[w]" function may facilitate creation of a matrix for determination of the hypothesis index 226 wherein "i" may refer to the second words data set and "j" may refer to the word index 204. In an example, the "x_indices[1, j]=word_to_index[w]" function may facilitate creation of a matrix for determination of the premise graph 230, wherein "i" may refer to that first words data set and "j" may refer to the second-word data set 224. In an example, the "x_indices[1, j]=word_to_index[w]" function may facilitate creation of a matrix for determination of the hypothesis graph 232, wherein "i" may refer to that second words data set and "j" may refer to the first word data set 214.

The matrix creation 508 may be followed by a comparison of 510. The comparison 510 may evaluate a number of characters in the "j" component of the matrix created by the matrix creation 508. If the number of characters in the "j" component may be less than a maximum sequence length defined by the user, the process 500 may execute the word index identification 506. If the number of characters in the "j" component may not be less than a maximum sequence length defined by the user, the process 500 may execute the comparison 504. For the sake of brevity, further details about various functions may be explained in detail hereinafter, however the same should be clear to a person skilled in the art.

Figure 6A:
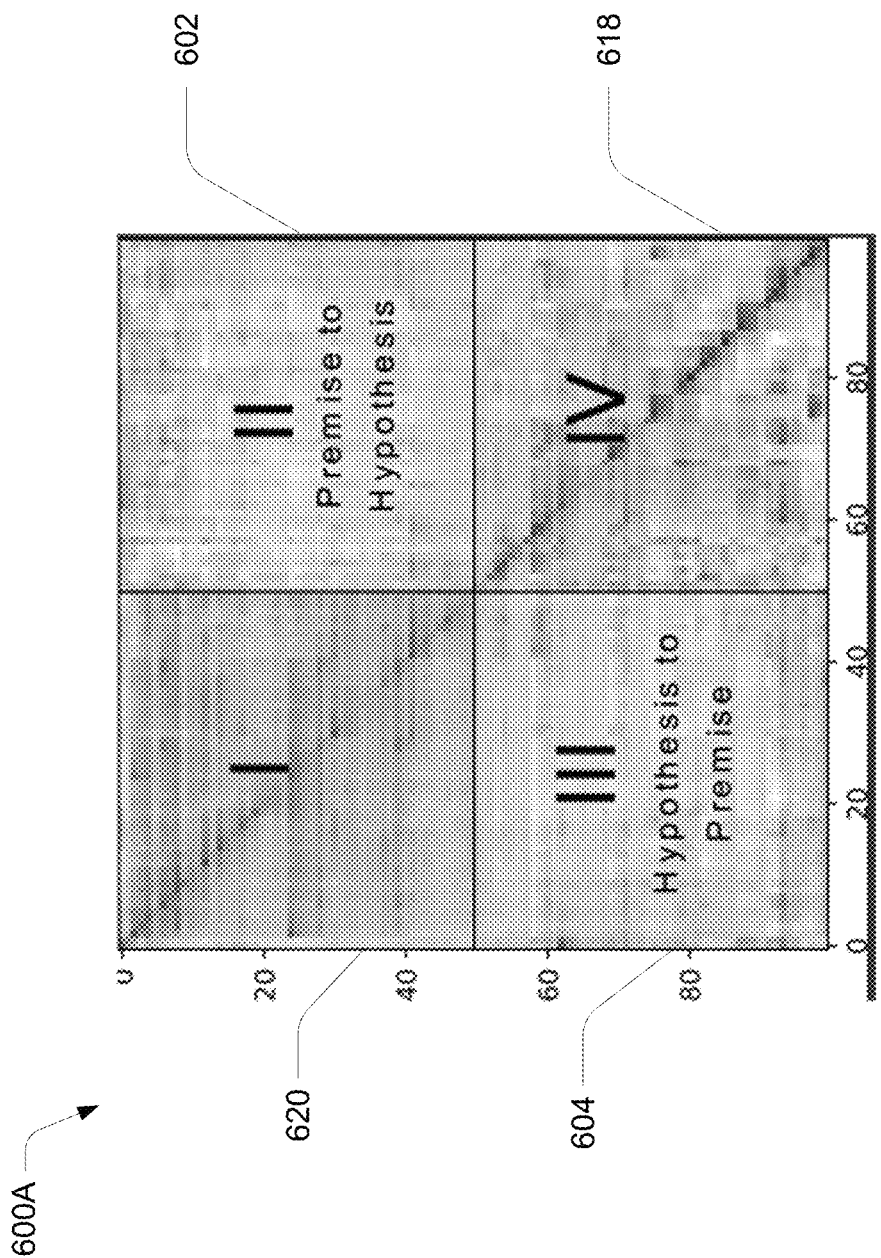
FIG. 6A illustrates a pictorial representation of a premise mapping with a hypothesis using a textual entailment system, according to an example embodiment of the present disclosure.

FIG. 6A illustrates a pictorial representation 600A of the premise 212 mapping with a hypothesis using a textual entailment system, according to an example embodiment of the present disclosure. Any of the components of the system 110 as described by the way of FIG. 1, FIG. 2, FIG. 3, FIG. 4 and FIG. 5 may be deployed by the pictorial representation 600. In an example, the pictorial representation 600A may depict a set of graphs corresponding to the attention layer in the neural network model described by way of FIG. 2 and FIG. 3. In accordance with various embodiments of the present disclosure, the pictorial representation 600A may include a first quadrant 620, a second quadrant 602, a third quadrant 604, and a fourth quadrant 618. In an example, each of the first quadrant 620, the second quadrant 602, the third quadrant 604, and the fourth quadrant 618 in the pictorial representation 600A may contain the premise 212-hypothesis attentions for the concatenated premise 212-hypothesis sentence strings. In an example, each string may have a length of 50 characters with a concatenated string of length 100 characters. In an example, the second quadrant 602 may represent the premise graph 230 and the third quadrant 604 may represent the hypothesis graph 232.

Figure 6B:
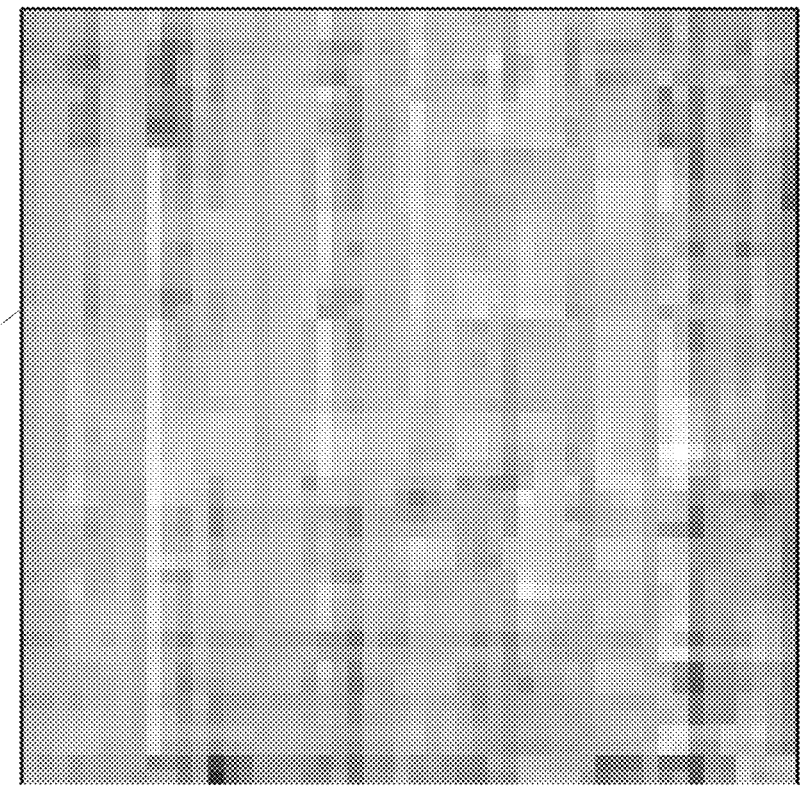
FIG. 6B illustrates a pictorial representation of a premise mapping with a hypothesis using a textual entailment system, according to an example embodiment of the present disclosure.
Figure 6B:
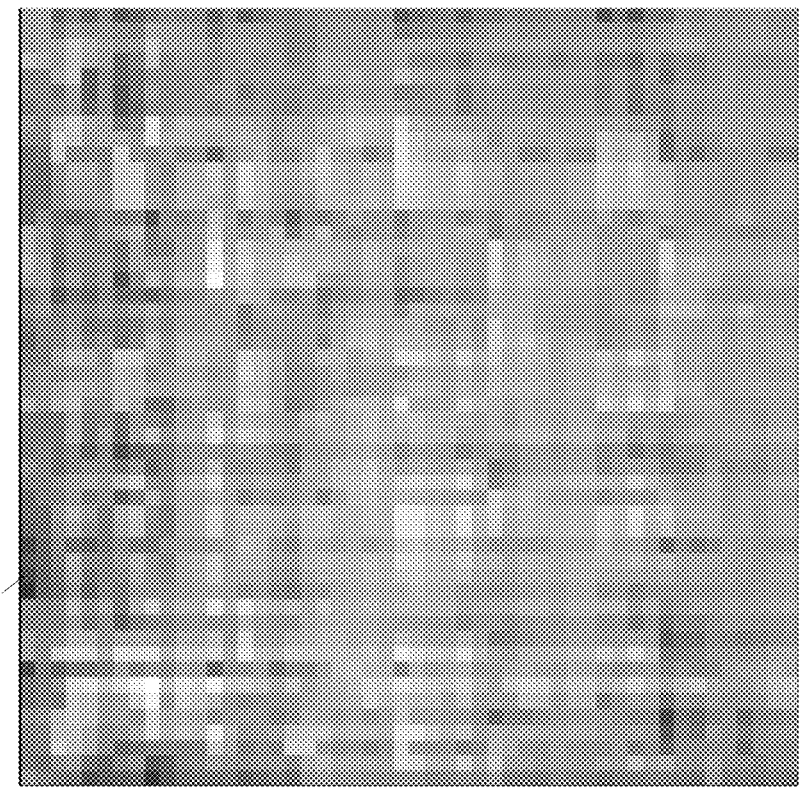

FIG. 6B illustrates a pictorial representation 600B of the premise 212 mapping with a hypothesis from the plurality of hypothesis 222 using a textual entailment system, according to an example embodiment of the present disclosure. The pictorial representation 600B includes a graph 606 and a graph 608. For example, the system 110 may identify the premise 212 as "On 20 May 2016, the patient started therapy with Provas (valsartan), tablet, at 80 mg once daily via oral route for hypertension. On 20 Mar. 2018, the patient was hospitalized for Myocardial infarction and congestive cardiac failure. The patient was died on the same day due to Myocardial infarction". Additionally, the system 110 may identify a hypothesis from the plurality of hypothesis 222 to be "Provas (valsartan) has caused Myocardial infarction and congestive cardiac failure". The graph 606 may represent the premise graph 230 wherein, words from the exemplary premise 212 mentioned above may be mapped with the words from the exemplary hypothesis mentioned above. The graph 608 may represent the hypothesis graph 232, wherein, words from the exemplary hypothesis mentioned above may be mapped with the words from the exemplary premise 212 mentioned above.

Figure 6C:
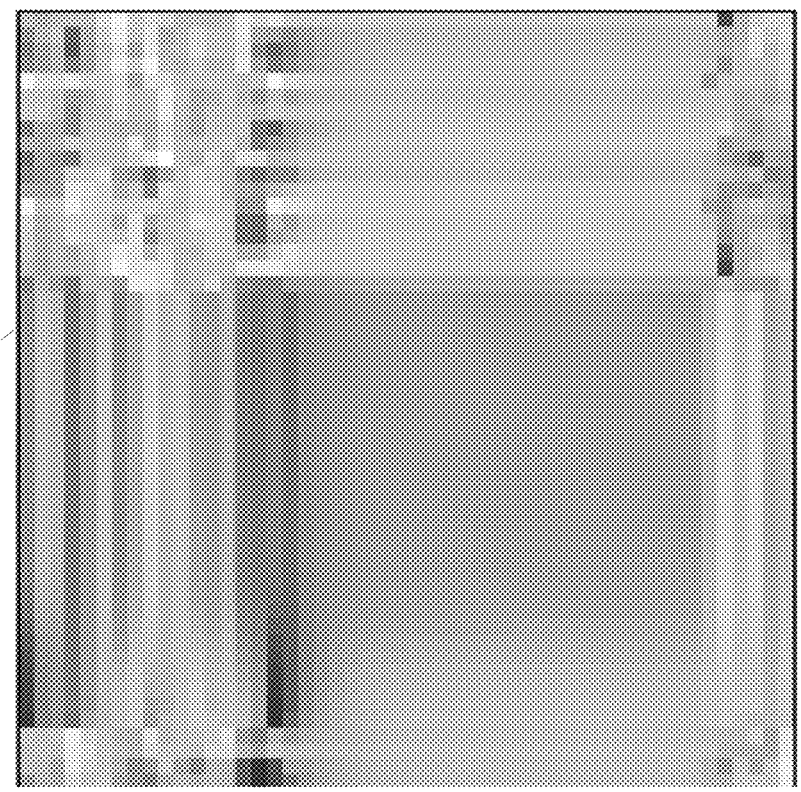
FIG. 6C illustrates a pictorial representation of a premise mapping with a hypothesis using a textual entailment system, according to an example embodiment of the present disclosure.
Figure 6C:
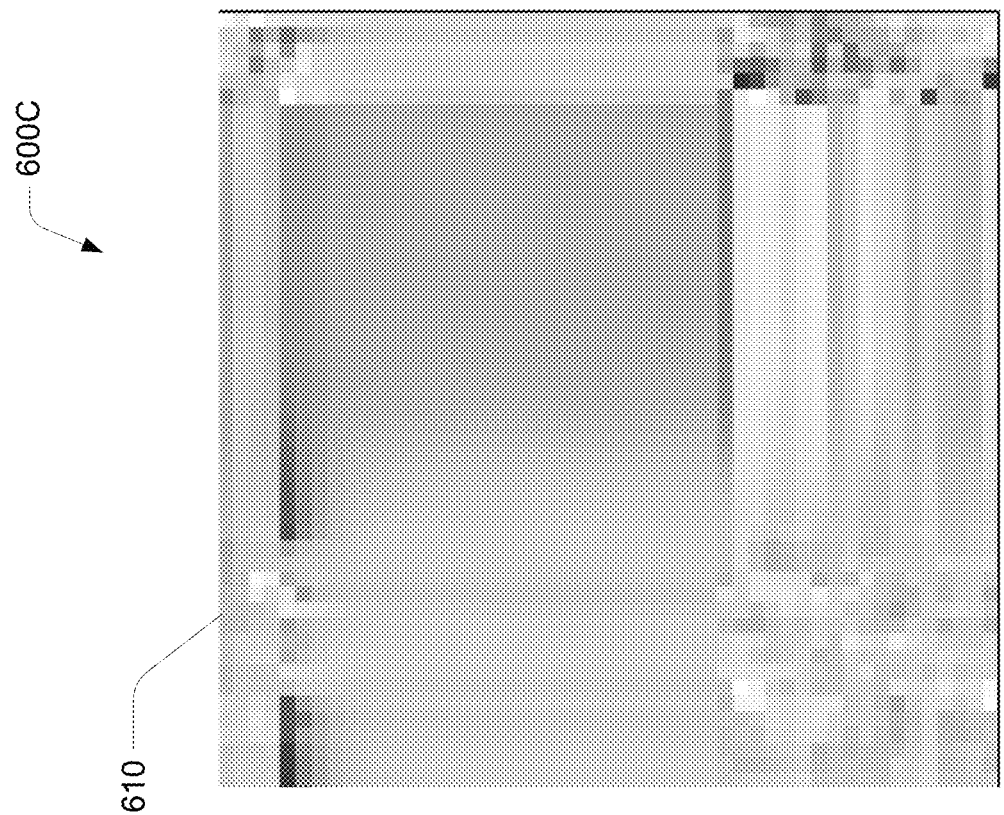
Figure 6D:
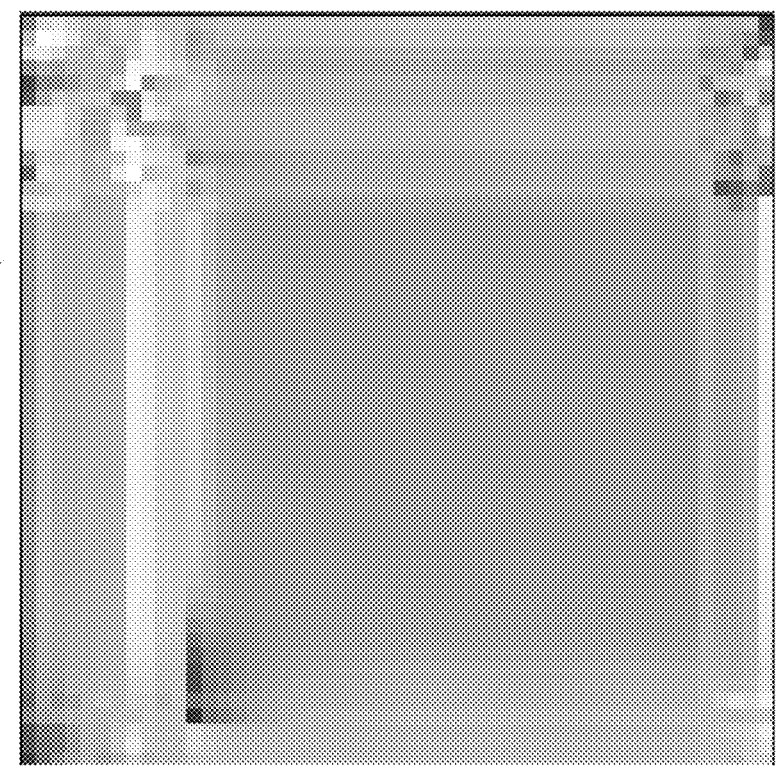
FIG. 6D illustrates a pictorial representation of a premise mapping with a hypothesis using a textual entailment system, according to an example embodiment of the present disclosure.
Figure 6D:
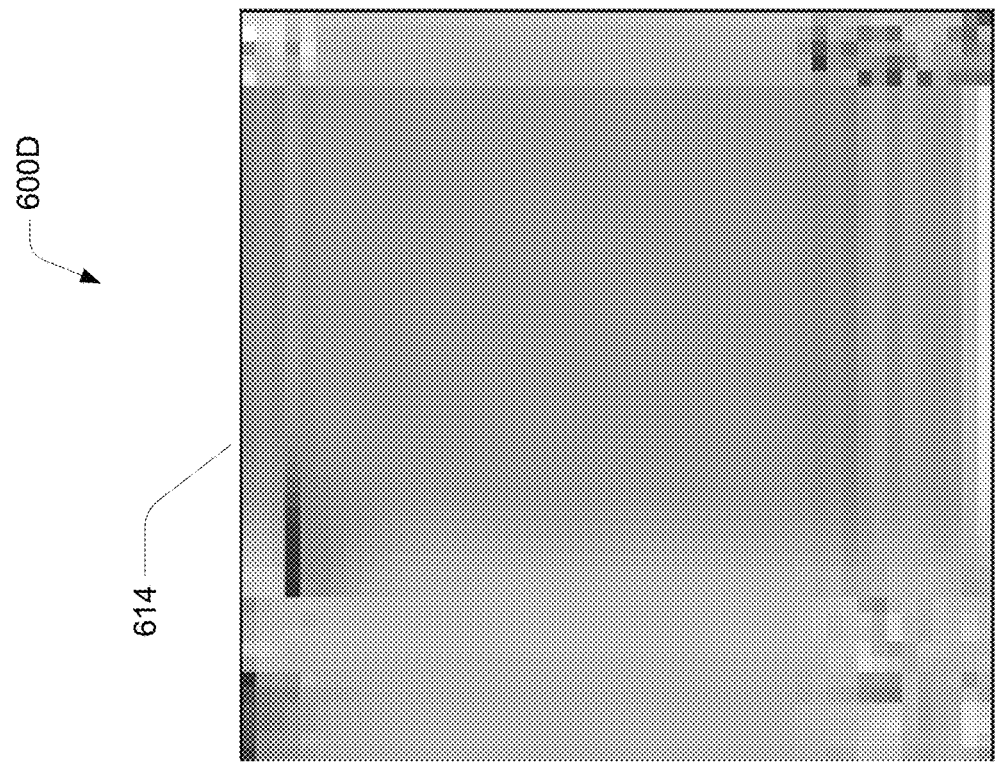

FIG. 6C illustrates a pictorial representation 600C of the premise 212 mapping with a hypothesis from the plurality of hypothesis 222 using a textual entailment system, according to an example embodiment of the present disclosure. The pictorial representation 600B includes a graph 610 and a graph 612. For example, the system 110 may identify the premise 212 as "This church choir sings to the masses as they sing joyous songs from the book at a church". Additionally, the system 110 may identify a hypothesis from the plurality of hypothesis 222 to be "The church is filled with song". The graph 610 may represent the premise graph 230 wherein, words from the exemplary premise 212 mentioned above may be mapped with the words from the exemplary hypothesis mentioned above. The graph 612 may represent the hypothesis graph 232, wherein, words from the exemplary hypothesis mentioned above may be mapped with the words from the exemplary premise 212 mentioned above FIG. 6D illustrates a pictorial representation 600D of the premise 212 mapping with a hypothesis from the plurality of hypothesis 222 using a textual entailment system, according to an example embodiment of the present disclosure. The pictorial representation 600B includes a graph 614 and a graph 616. For example, the system 110 may identify the premise 212 as "A woman with a green headscarf, blue shirt, and a very big grin". Additionally, the system 110 may identify a hypothesis from the plurality of hypothesis 222 to be "The woman is very happy". The graph 614 may represent the premise graph 230 wherein, words from the exemplary premise 212 mentioned above may be mapped with the words from the exemplary hypothesis mentioned above. The graph 616 may represent the hypothesis graph 232, wherein, words from the exemplary hypothesis mentioned above may be mapped with the words from the exemplary premise 212 mentioned above FIG. 7A illustrates a flow diagram for a tokenization operation 700, according to an example embodiment of the present disclosure. Any of the components of the system 110 as described by the way of FIG. 1, FIG. 2, FIG. 3, FIG. 4, FIG. 5. And FIG. 6 may be deployed by the system 110 for the tokenization operation 700. The tokenization may be a task of chopping the entailment data various into pieces, called tokens and remove certain characters, such as punctuation. In an example, the tokenizer may transform text into a set of vectors, which may be used for word embedding. The tokenization operation 700 may include a "tokenizer.fit_on_texts( )" function and Keras "model.fit( ) training" function. The trained models may be saved and pickled for future use. These serialized models may be loaded onto a web service to determine entailment information related with the entailment data. In an example, the tokenization operation 700 may determine a token, which may be used to tokenize out of the word index 204, the first word data set 214 and the second-word data set 224 in a tokenizer class corresponding to the premise index 216 and hypothesis index 226.

The tokenization operation 700 may include an initialization 702. The initialization 702 may initiate an RNN model and load the entailment data onto the system 110. The initialization 702 may be followed by a comparison 704. The comparison 704 may evaluate the entailment data by executing an "isTrain" function. In an example, wherein the entailment data may not be trained, the tokenization operation 700 may execute a function 716. The function 716 may be "tokenizer ← pickle.load(tokenizer_file)" function. The function 716 may be followed by a function 718. In an example, the function 718 may be "model ← load_model (model_file)" function. In an example, wherein the entailment data may be trained, the tokenization operation 700 may execute a function 706. The function 706 may be "tokenizer ← Tokenizer( )fit_on_texts(train_premise 212+ train_hyp)" function. The function 716 may execute a picklization 708 for a text created as an output for the "tokenizer→TokenizerQ.fit_on_texts(train_premise 212+ train_hyp)" function. The picklization 708 may execute a "pickle.dump(tokenizer, tokenizer file)" function. The function 706 may be followed by a function 710, which may create tokenization models. In an example, the function 710 may be "model→lstm-entailment (shape, units)" function. The function 710 may be followed by a function 712. In an example, the function 712 may be "model.fit (x_train, z_train, validation_data→(x_val, z_val))" function. The function 712 may be followed by a function 714, wherein the tokenization operation 700 may execute a "model.save (model_file)" for saving the trained models created by the function 712. The tokenization operation 700 may execute a model returning function 720 after executing the function 712 and the function 718. The model returning function 720 may return tokenized strings for the premise 212 and the plurality of hypothesis 222. For sake of brevity, further details about various functions are not mentioned herein, however, the same should be clear to a person skilled in the art.

Figure 7B:
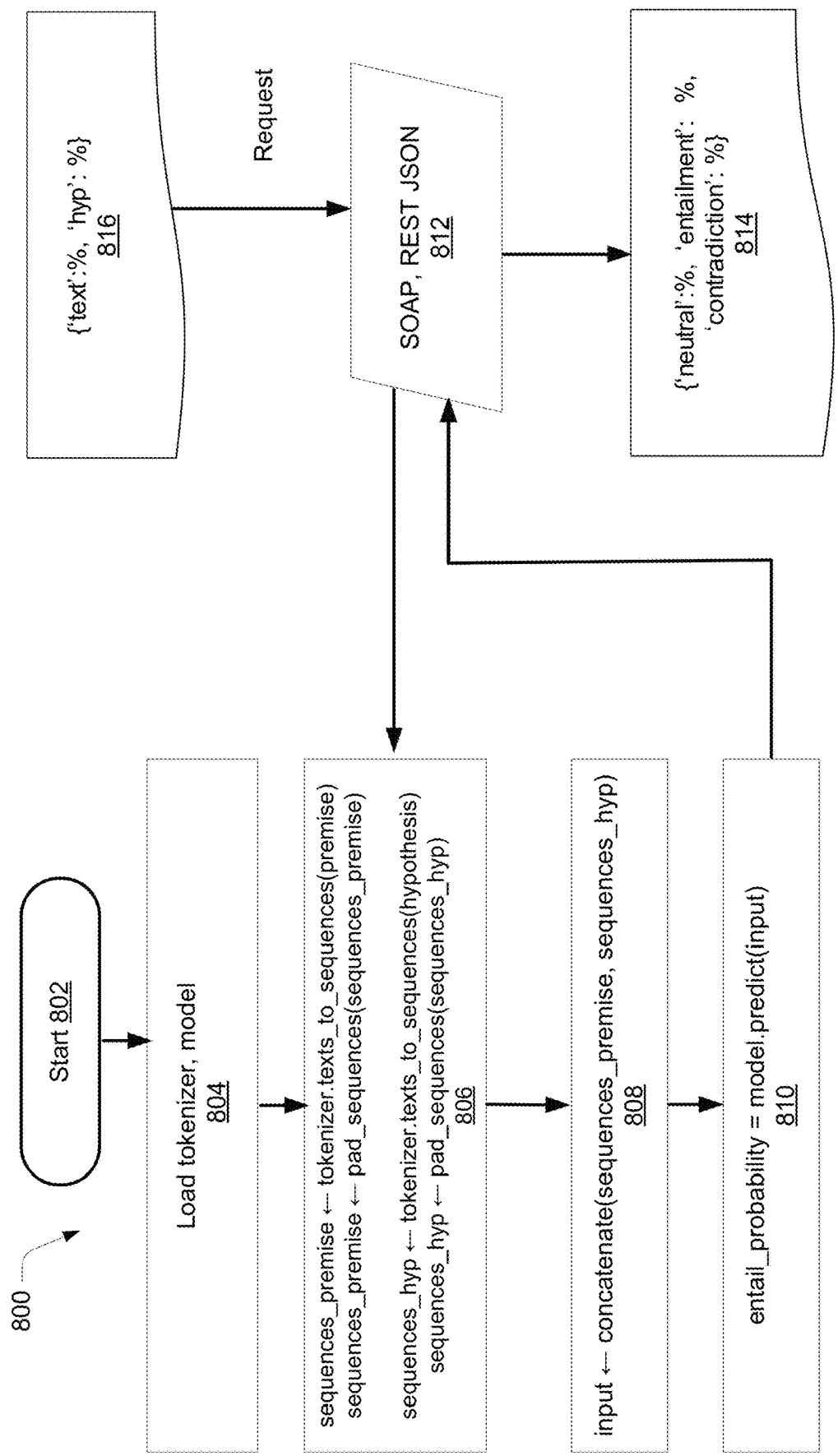
FIG. 7B illustrates a flow diagram for a prediction of an entailment using a textual entailment system, according to an example embodiment of the present disclosure.

FIG. 7B illustrates a flow diagram for a process 800 for prediction of an entailment using a textual entailment system, according to an example embodiment of the present disclosure. Any of the components of the system 110 as described by the way of FIG. 1, FIG. 2, FIG. 3, FIG. 4, FIG. 5, FIG. 6 and FIG. 7 may be deployed by the system 110 for the process 800. The process 800 may include an initialization 802, wherein the entailment data may be loaded onto the system 110. The initialization 802 may be followed by a model loading 804, wherein the tokenization models created by the tokenization operation 700. The process 800 may further include a sequencer 806. The sequencer 806 may generate sequences for the premise 212 and the plurality of hypothesis 222 based on the tokenization models. In an example, the sequencer 806 may execute a "sequences_premise 212→tokenize.texts_to_sequences(premise 212)" function, a "sequences_premise 212 ← pad_sequences(sequences_premise 212)" function, a sequences_hyp ← tokenizer.texts_to_sequences(hypothesis)" function, and a "sequences_hyp ← pad_sequences(sequences_hyp)" function. In an example, the sequencer 806 may determine the premise index 216 and the hypothesis index 226. The process 800 may further include a concatenation 808. The concatenation 808 may execute a "input ← concatenate (sequences_premise 212, sequences_hyp)" function. The concatenation 808 may determine the premise graph 230 and the hypothesis graph 232. The concatenation 808 may be followed by a function 810. The function 810 may execute a function "input ← concatenate(sequences_premise 212, sequences_hyp)" The function 810 may determine the confidence index 228 for the plurality of hypothesis 222 from the premise index 216, the hypothesis index 226, the premise graph 230, the hypothesis graph 232 determined by the concatenation 808 and the sequencer 806. The process 800 may further include a function 812. The function 812 may be followed by the function 810. The function 812 may deploy a SOAP® (Simple Object Access Protocol) or a REST® (Representational State Transfer) web service or may be used to determine entailment information. The function 812 may deploy a JSON® (JavaScript Object Notation) to determine entailment information. The process 800 may include providing an entailment response as a probability confidence score corresponding to the entailed output. In an example, the function 812 may be followed by a function 814. The function 814 may determine the entailment value 236, the contradiction value 238, the neutral entailment value 240, and the entailed output index 242.

For example, for the premise 212 "Other causes of rhabdomyolysis were excluded and expert opinion agreed that the most likely cause was the influenza vaccination with the concurrent use of simvastatin.", a corresponding hypothesis may be "Simvastatin has caused rhabdomyolysis." The function 814 may provide the entailment response as a probability confidence score to be "neutral": 4.2, "contradiction": 0, and "entailment": 94.8. In another example, for the premise 212 "Two young children in blue jerseys, one with the number 9 and one with the number 2 are standing on wooden steps in a bathroom and washing their hands in a sink.", a corresponding hypothesis may be "Two kids in jackets walk to school." The function 814 may provide the entailment response as a probability confidence score to be "neutral": 3.5, "contradiction": 96.3, and "entailment": 0. The function 814 may provide the probability confidence score corresponding to the entailed output to the function 812. The function 812 may execute a function 816. The function 816 may provide the entailment result 244 to the user.

Figure 8:
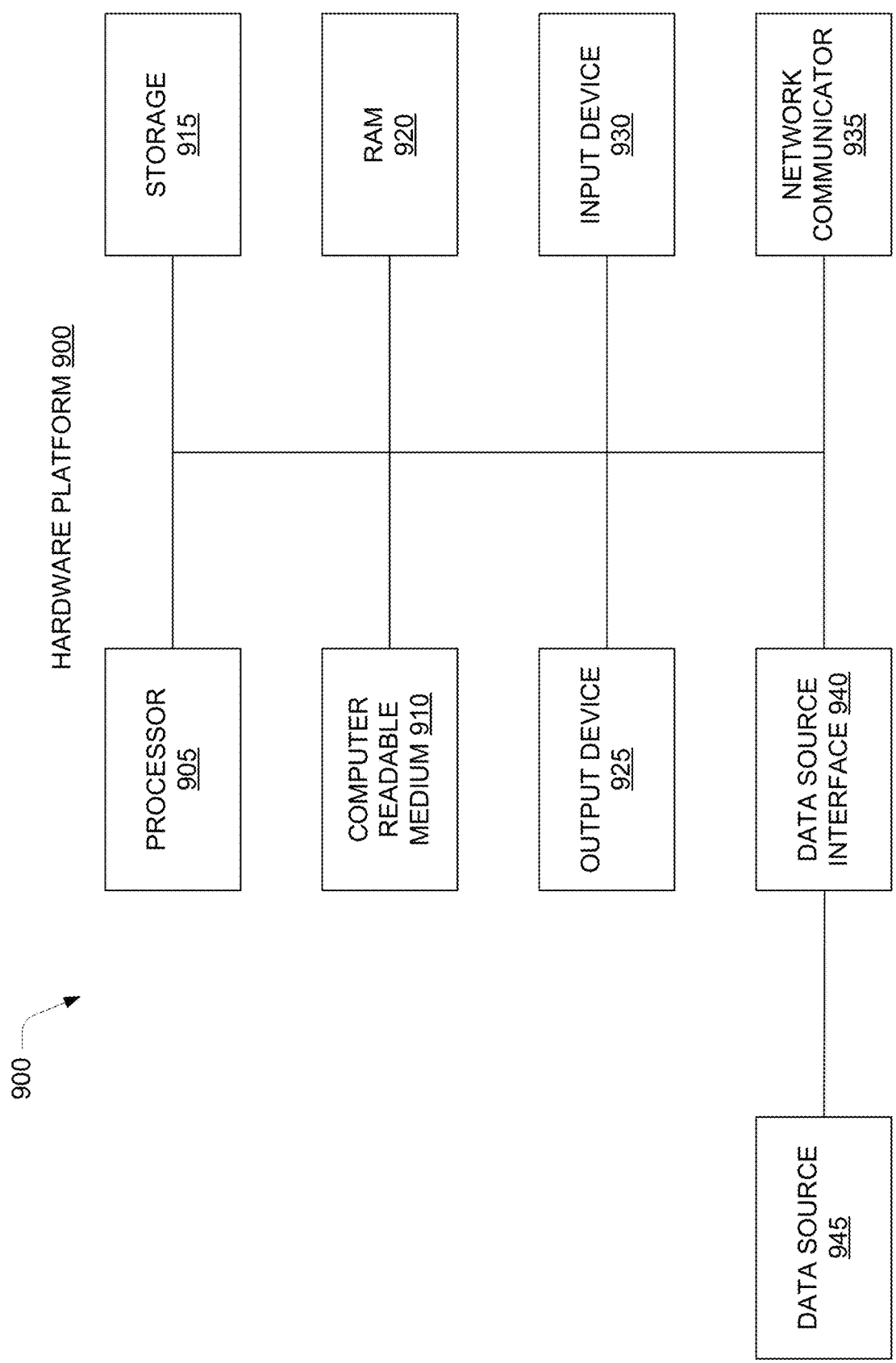
FIG. 8 illustrates a hardware platform for the implementation of a textual entailment system, according to an example embodiment of the present disclosure.

FIG. 8 illustrates a hardware platform 900 for implementation of the system 110, according to an example embodiment of the present disclosure. Particularly, computing machines such as but not limited to internal/external server clusters, quantum computers, desktops, laptops, smartphones, tablets and wearables which may be used to execute the system 110 or may have the structure of the hardware platform 900. The hardware platform 900 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 8, the hardware platform 900 may be a computer system 900 that may be used with the examples described herein. The computer system 900 may represent a computational platform that includes components that may be in a server or another computer system. The computer system 900 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 900 may include a processor 905 that executes software instructions or code stored on a non-transitory computer-readable storage medium 910 to perform methods of the present disclosure. The software code includes, for example, instructions to gather data and documents and analyze documents. In an example, the entailment data organizer 130, the hypothesis generator 140 and the modeler 150 may be software codes or components performing these steps.

The instructions on the computer-readable storage medium 910 are read and stored the instructions in storage 915 or in random access memory (RAM) 920. The storage 915 provides a large space for keeping static data where at least some instructions could be stored for later execution. The stored instructions may be further compiled to generate other representations of the instructions and dynamically stored in the RAM 920. The processor 905 reads instructions from the RAM 920 and performs actions as instructed.

The computer system 900 further includes an output device 925 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 900 further includes input device 930 to provide a user or another device with mechanisms for entering data and/or otherwise interact with the computer system 900. The input device may include, for example, a keyboard, a keypad, a mouse, or a touchscreen. In an example, the output of the hypothesis generator 140 and the modeler 150 may be displayed on the output device 925. Each of these output devices 925 and input devices 930 could be joined by one or more additional peripherals. In an example, the output device 925 may be used to display the results of the data entailment requirement 202.

A network communicator 935 may be provided to connect the computer system 900 to a network and in turn to other devices connected to the network including other clients, servers, data stores, and interfaces, for instance. A network communicator 935 may include, for example, a network adapter such as a LAN adapter or a wireless adapter. The computer system 900 includes a data source interface 940 to access data source 945. A data source is an information resource. As an example, a database of exceptions and rules may be a data source. Moreover, knowledge repositories and curated data may be other examples of data sources.

Figure 9A:
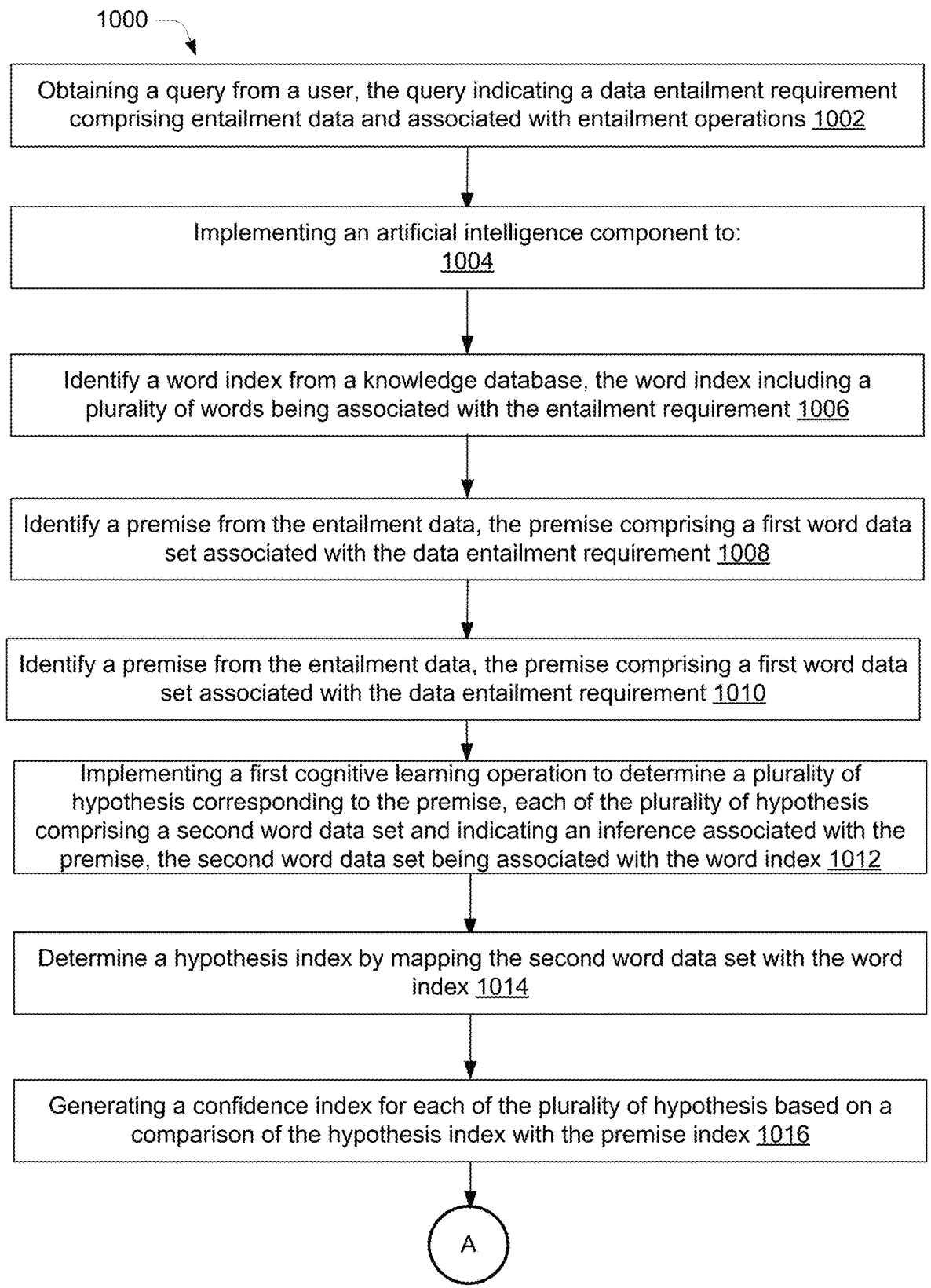
FIGS. 9A and 9B illustrate a process flowchart for a textual entailment system, according to an example embodiment of the present disclosure.
Figure 9B:
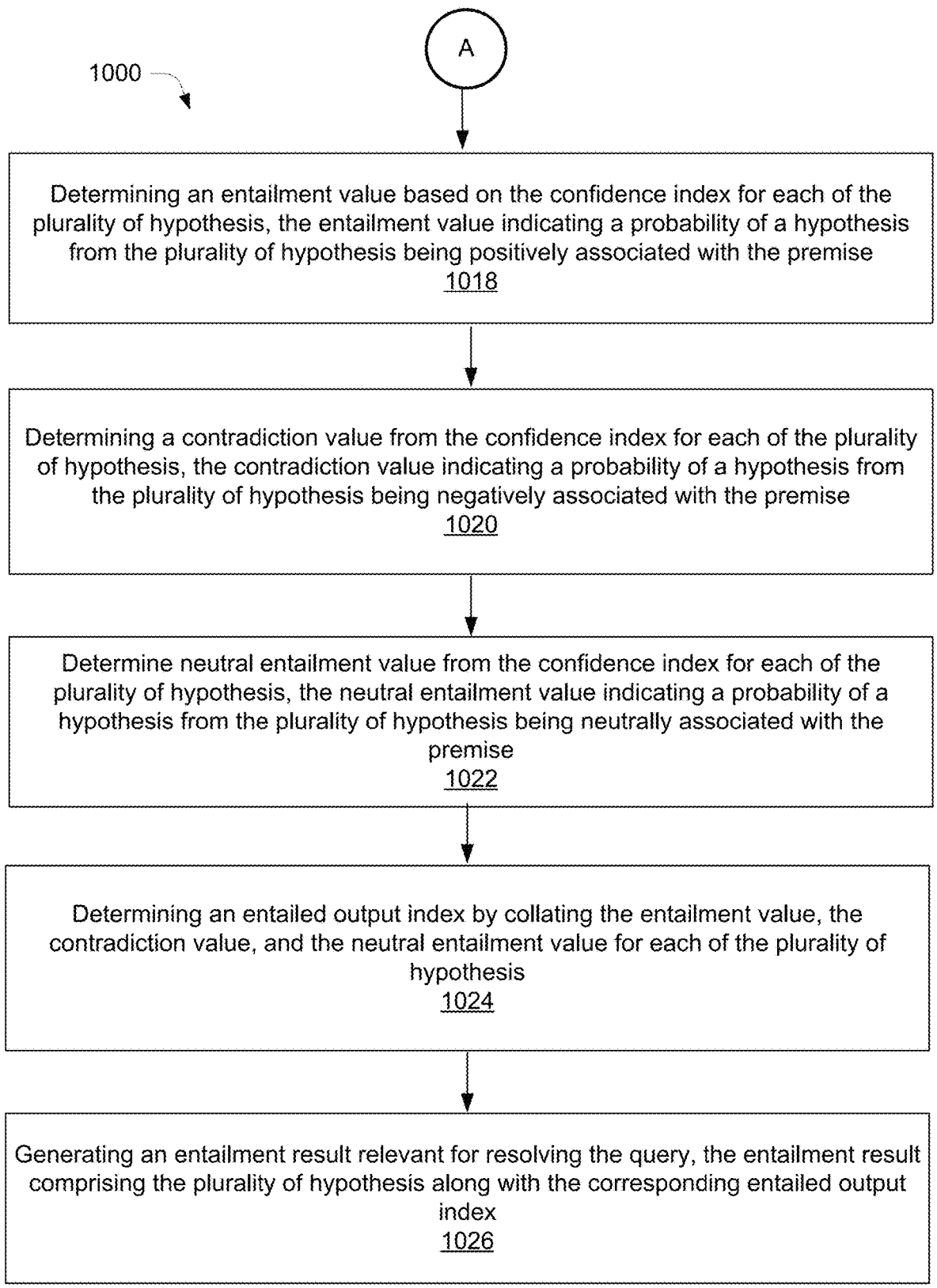

FIGS. 9A and 9B illustrate a method 1000 for the textual entailment system 110 according to an example embodiment of the present disclosure.

It should be understood that method steps are shown here for reference only and other combinations of the steps may be possible. Further, the method 1000 may contain some steps in addition to the steps shown in FIGS. 9A and 9B For the sake of brevity, construction and operational features of the system 100 which are explained in detail in the description of FIG. 1, FIG. 2, FIG. 3, FIG. 4, FIG. 5, FIG. 6A, FIG. 6B, FIG. 6C, FIG. 6D, FIGS. 7A and 7B, and FIG. 8 are not explained in detail in the description of FIGS. 9A and 9B. The method 1000 may be performed by a component of the system 110, such as the processor 120, the entailment data organizer 130, the hypothesis generator 140 and the modeler 150.

At block 1002, a query may be obtained from a user. The query may be indicating a data entailment requirement 202 comprising entailment data and associated with the entailment operations.

At block 1004, the artificial intelligence component 218 may be implemented by the system 110.

At block 1006, the artificial intelligence component 218 may be implemented to identify a word index 204 from a knowledge database 206. The word index 204 may be including a plurality of words 208 being associated with the entailment requirement. In an example, the knowledge database 206 is a natural language data directory.

At block 1008, the artificial intelligence component 218 may be implemented to identify the premise 212 from the entailment data. The premise 212 may be comprising the first word data set 214 to be associated with the data entailment requirement 202.

At block 1010, the artificial intelligence component 218 may be implemented to determine a premise index 216 by mapping the first word data set 214 with the word index 204.

At block 1012, the first cognitive learning operation 220 may be implemented to determine a plurality of hypothesis 222 corresponding to the premise 212. In an example, each of the plurality of hypothesis 222 may be comprising a second-word data set 224 and indicating an inference associated with the premise 212. The second-word data set 224 may be associated with the word index 204.

At block 1014, a hypothesis index 226 may be determined by mapping the second-word data set 224 with the word index 204.

At block 1016, a confidence index 228 may be generated for each of the plurality of hypothesis 222 based on a comparison of the hypothesis index 226 with the premise index 216.

At block 1018, the entailment value 236 may be determined based on the confidence index 228 for each of the plurality of hypothesis 222. The entailment value 236 may be indicating a probability of a hypothesis from the plurality of hypothesis 222 being positively associated with the premise 212.

At block 1020, the contradiction value 238 may be determined from the confidence index 228 for each of the plurality of hypothesis 222. The contradiction value 238 indicating a probability of a hypothesis from the plurality of hypothesis 222 being negatively associated with the premise 212.

At block 1022, the neutral entailment value 240 may be determined from the confidence index 228 for each of the plurality of hypothesis 222. The neutral entailment value 240 indicating a probability of a hypothesis from the plurality of hypothesis 222 being neutrally associated with the premise 212.

At block 1024, the entailed output index 242 may be determined by collating the entailment value 236, the contradiction value 238, and the neutral entailment value 240 for each of the plurality of hypothesis 222.

At block 1026, the entailment result 244 relevant may be generated for resolving the query. The entailment result 244 comprising the plurality of hypothesis 222 along with the corresponding entailed output index 242. In an example, the entailment result 244 further including an entailment output corresponding to the highest value from the entailed output index 242 associated with each of the plurality of hypothesis 222.

In an example, the method 1000 may further include generating the premise graph 230 and the hypothesis graph 232. The premise graph 230 may be mapping the first word data set 214 against the second-word data set 224, and the hypothesis graph 232 may be mapping the second-word data set 224 against the first word data set 214. In an example, the confidence index 228 may be generated by comparing the premise graph 230 and the hypothesis graph 232. The method 1000 may further include implementing the second cognitive learning operation 234 for identifying the highest value amongst the entailment value 236, the contradiction value 238, and the neutral entailment value 240 for each of the plurality of hypothesis 222.

In an example, the method 1000 may comprise creating the entailment data library by associating entailment data with the premise 212, the plurality of hypothesis 222 and the confidence index 228 for each of the plurality of hypothesis 222.

In an example, the method 1000 may be practiced using a non-transitory computer-readable medium. In an example, the method 1000 may be a computer-implemented method.

The present disclosure provides for a textual entailment system which may generate textual insights while incurring minimal costs. Furthermore, the present disclosure may categorically analyze various parameters that may have an impact on the generation of a hypothesis for textual entailment and analyze a document presented for entailment accordingly.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
   a processor;
   an entailment data organizer coupled to the processor, the entailment data organizer to:
     obtain a query from a user, the query indicating a data entailment requirement comprising entailment data and associated with entailment operations; and
     implement an artificial intelligence component to:
       identify a word index from a knowledge database, the word index including a plurality of words being associated with the data entailment requirement;
       identify a premise from the entailment data, the premise comprising a first word data set associated with the data entailment requirement; and
       determine a premise index by mapping the first word data set with the word index;
   a hypothesis generator coupled to the processor, the hypothesis generator to:
     implement a first cognitive learning operation to determine a plurality of hypothesis corresponding to the premise, each of the plurality of hypothesis comprising a second word data set and indicating an inference associated with the premise, the second word data set being associated with the word index;
     determine a hypothesis index by mapping the second word data set with the word index;
     generate a premise graph and a hypothesis graph, the premise graph mapping the first word data set against the second word data set, and the hypothesis graph mapping the second word data set against the first word data set; and
     generate a confidence index for each of the plurality of hypothesis based on a comparison of the hypothesis index with the premise index; and
   a modeler coupled to the processor, the modeler to implement a second cognitive learning operation to:
     determine an entailment value based on the confidence index for each of the plurality of hypothesis, the entailment value indicating a probability of a hypothesis from the plurality of hypothesis being positively associated with the premise;
     determine a contradiction value from the confidence index for each of the plurality of hypothesis, the contradiction value indicating a probability of a hypothesis from the plurality of hypothesis being negatively associated with the premise; and
     determine a neutral entailment value from the confidence index for each of the plurality of of hypothesis, the neutral entailment value indicating a probability of a hypothesis from the plurality of hypothesis being neutrally associated with the premise;
     determine an entailed output index by collating the entailment value, the contradiction value, and the neutral entailment value for each of the plurality of hypothesis; and
     generate an entailment result relevant for resolving the query, the entailment result comprising the plurality of hypothesis along with the corresponding entailed output index.

2. The system as claimed in claim 1, wherein the knowledge database is a natural language data directory.

3. The system as claimed in claim 1, wherein the hypothesis generator is to generate the confidence index by comparing the premise graph and the hypothesis graph.

4. The system as claimed in claim 1, wherein the modeler implements the second cognitive learning operation for identifying a highest value amongst the entailment value, the contradiction value, and the neutral entailment value for each of the plurality of hypothesis.

5. The system as claimed in claim 4, wherein the entailment result further includes an entailment output corresponding to the highest value from the entailed output index associated with each of the plurality of hypothesis.

6. The system as claimed in claim 1, wherein the entailment data organizer is to further establish an entailment data library by associating the entailment data with the premise, the plurality of hypothesis and the confidence index for each of the plurality of hypothesis.

7. A method comprising:
   obtaining, by a processor, a query from a user, the query indicating a data entailment requirement comprising entailment data and associated with entailment operations;
   implementing, by the processor, an artificial intelligence component to:
     identify a word index from a knowledge database, the word index including a plurality of words being associated with the data entailment requirement;
     identify a premise from the entailment data, the premise comprising a first word data set associated with the data entailment requirement; and
     determine a premise index by mapping the first word data set with the word index;
   implementing, by the processor, a first cognitive learning operation to determine a plurality of hypothesis corresponding to the premise, each of the plurality of hypothesis comprising a second word data set and indicating an inference associated with the premise, the second word data set being associated with the word index;

determining, by the processor, a hypothesis index by mapping the second word data set with the word index;

generating, b the processor, a premise graph and a hypothesis graph, the premise graph mapping the first word data set against the second word data set, and the hypothesis graph mapping the second word data set against the first word data set;

generating, by the processor, a confidence index for each of the plurality of hypothesis based on a comparison of the hypothesis index with the premise index;

determining, by the processor, an entailment value based on the confidence index for each of the plurality of hypothesis, the entailment value indicating a probability of a hypothesis from the plurality of hypothesis being positively associated with the premise;

determining, by the processor, a contradiction value from the confidence index for each of the plurality of hypothesis, the contradiction value indicating a probability of a hypothesis from the plurality of hypothesis being negatively associated with the premise;

determining, by the processor, neutral entailment value from the confidence index for each of the plurality of hypothesis, the neutral entailment value indicating a probability of a hypothesis from the plurality of hypothesis being neutrally associated with the premise;

determining, by the processor, an entailed output index by collating the entailment value, the contradiction value, and the neutral entailment value for each of the plurality of hypothesis; and generating, by the processor, an entailment result relevant for resolving the query, the entailment result comprising the plurality of hypothesis along with the corresponding entailed output index.

8. The method as claimed in claim 7, wherein the knowledge database is a natural language data directory.

9. The method as claimed in claim 7, wherein the method further comprises generating, by the processor, the confidence index by comparing the premise graph and the hypothesis graph.

10. The method as claimed in claim 7, wherein the method further comprises implementing a second cognitive learning operation for identifying a highest value amongst the entailment value, the contradiction value, and the neutral entailment value for each of the plurality of hypothesis.

11. The method as claimed in claim 10, wherein the entailment result further includes an entailment output corresponding to the highest value from the entailed output index associated with each of the plurality of hypothesis.

12. The method as claimed in claim 7, wherein the method further comprises establishing, by the processor, an entailment data library, by associating the entailment data with the premise, the plurality of hypothesis and the confidence index for each of the plurality of hypothesis.

13. A non-transitory computer readable medium including machine readable instructions that are executable by a processor to:

obtain a query from a user, the query indicating a data entailment requirement comprising entailment data and associated with entailment operations;

implement an artificial intelligence component to:
identify a word index from a knowledge database, the word index including a plurality of words being associated with the data entailment requirement;

identify a premise from the entailment data, the premise comprising a first word data set associated with the data entailment requirement; and determine a premise index by mapping the first word data set with the word index;

implement a first cognitive learning operation to determine a plurality of hypothesis corresponding to the premise, each of the plurality of hypothesis comprising a second word data set and indicating an inference associated with the premise, the second word data set being associated with the word index:

determine a hypothesis index by mapping the second word data set with the word index;

generate a premise graph and a hypothesis graph, the premise graph mapping the first word data set against the second word data set, and the hypothesis graph mapping the second word data set against the first word data set:

generate a confidence index for each of the plurality of hypothesis based on a comparison of the hypothesis index with the premise index;

determine an entailment value based on the confidence index for each of the plurality of hypothesis, the entailment value indicating a probability of a hypothesis from the plurality of hypothesis being positively associated with the premise;

determine a contradiction value from the confidence index for each of the plurality of hypothesis, the contradiction value indicating a probability of a hypothesis from the plurality of hypothesis being negatively associated with the premise;

determine neutral entailment value from the confidence index for each of the plurality of hypothesis, the neutral entailment value indicating a probability of a hypothesis from the plurality of hypothesis being neutrally associated with the premise;

determine an entailed output index by collating the entailment value, the contradiction value, and the neutral entailment value for each of the plurality of hypothesis; and generate an entailment result relevant for resolving the query, the entailment result comprising the plurality of hypothesis along with the corresponding entailed output index.

14. The non-transitory computer-readable medium of claim 13, wherein the knowledge database is a natural language data directory.

15. The non-transitory computer-readable medium of claim 13, wherein the processor is to generate the confidence index by comparing the premise graph and the hypothesis graph.

16. The non-transitory computer-readable medium of claim 13, wherein the processor is to implement a second cognitive learning operation for identifying a highest value amongst the entailment value, the contradiction value, and the neutral entailment value for each of the plurality of hypothesis.

17. The non-transitory computer-readable medium of claim 16, wherein the entailment result further includes an entailment output corresponding to the highest value from the entailed output index associated with each of the plurality of hypothesis.

* * * * *

UNITED STATES PATENT AND TRADEMARK OFFICE
CERTIFICATE OF CORRECTION

| | | |
|---|---|---|
| PATENT NO. | : 11,455,543 B2 | Page 1 of 1 |
| APPLICATION NO. | : 16/653523 | |
| DATED | : September 27, 2022 | |
| INVENTOR(S) | : Shaun Cyprian D'Souza et al. | |

It is certified that error appears in the above-identified patent and that said Letters Patent is hereby corrected as shown below:

In the Claims

At Claim 1, Column 28, Line 14, the phrase "plurality of of hypothesis" should instead read "plurality of hypothesis".

At Claim 7, Column 29, Line 3, the phrase "generating, b the processor" should instead read "generating, by the processor".

At Claim 13, Column 30, Line 11, the phrase "word index:" should instead read "word index;".

At Claim 13, Column 30, Line 17, the phrase "data set:" should instead read "data set;".

Signed and Sealed this
Fifteenth Day of August, 2023

Katherine Kelly Vidal
*Director of the United States Patent and Trademark Office*